US010945242B2

(12) United States Patent
Nan et al.

(10) Patent No.: US 10,945,242 B2
(45) Date of Patent: Mar. 9, 2021

(54) UPLINK INFORMATION TRANSMISSION METHOD, BASE STATION, AND USER EQUIPMENT

(71) Applicant: HUAWEI TECHNOLOGIES CO., LTD., Guangdong (CN)

(72) Inventors: Fang Nan, Beijing (CN); Zheng Yu, Beijing (CN); Yi Wang, Shanghai (CN); Xingqing Cheng, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 15/933,348

(22) Filed: Mar. 22, 2018

(65) Prior Publication Data

US 2018/0213525 A1 Jul. 26, 2018

Related U.S. Application Data

(63) Continuation of application No. PCT/CN2015/090817, filed on Sep. 25, 2015.

(51) Int. Cl.
*H04W 72/04* (2009.01)
*H04W 72/12* (2009.01)
(Continued)

(52) U.S. Cl.
CPC .......... *H04W 72/0413* (2013.01); *H04L 5/14* (2013.01); *H04W 72/044* (2013.01);
(Continued)

(58) Field of Classification Search
CPC ........ H04L 5/0012; H04L 5/14; H04W 48/10; H04W 4/70
See application file for complete search history.

(56) References Cited

U.S. PATENT DOCUMENTS

2013/0201936 A1 8/2013 Chen et al.
2016/0157191 A1* 6/2016 Yokomakura ....... H04W 52/365
370/252
(Continued)

FOREIGN PATENT DOCUMENTS

CN 101426274 A 5/2009
CN 102035786 A 4/2011
(Continued)

OTHER PUBLICATIONS

3GPP TSG-RAN WG4 Meeting #76 R4-155347, "Reply LS on retuning time between narrowband regions for MTC", RAN4,Aug. 24-28, 2015,total 1 page.
(Continued)

*Primary Examiner* — Mansour Oveissi
(74) *Attorney, Agent, or Firm* — Womble Bond Dickinson (US) LLP

(57) ABSTRACT

An uplink information transmission method, a base station, and user equipment are disclosed. The uplink information transmission method includes: sending, by UE, first uplink information on a first frequency resource of a first subframe set; and sending, by the UE, second uplink information on a second frequency resource of a second subframe set, where the first frequency resource and the second frequency resource are frequency resources included in two different narrowbands; a radio frame in which a subframe in the first subframe set is located is different from a radio frame in which a subframe in the second subframe set is located, and any subframe included in the first subframe set and any subframe included in the second subframe set belong to different radio frames.

20 Claims, 13 Drawing Sheets

(51) Int. Cl.
  *H04L 5/14*    (2006.01)
  *H04W 88/02*   (2009.01)
  *H04W 88/08*   (2009.01)

(52) U.S. Cl.
  CPC ........ *H04W 72/1268* (2013.01); *H04W 88/02* (2013.01); *H04W 88/08* (2013.01)

(56) References Cited

U.S. PATENT DOCUMENTS

| | | | |
|---|---|---|---|
| 2016/0295526 A1 | 10/2016 | Park et al. | |
| 2016/0323011 A1 | 11/2016 | Tang et al. | |
| 2018/0062699 A1* | 3/2018 | Horiuchi | H04W 48/12 |
| 2018/0241535 A1* | 8/2018 | Chen | H04W 48/12 |
| 2019/0069297 A1 | 2/2019 | Lee et al. | |

FOREIGN PATENT DOCUMENTS

| | | |
|---|---|---|
| CN | 103999528 A | 8/2014 |
| CN | 104221457 A | 12/2014 |
| CN | 104937860 A | 9/2015 |
| WO | 2011156683 A2 | 12/2011 |
| WO | 2014171683 A1 | 10/2014 |
| WO | 20151066909 A1 | 5/2015 |

OTHER PUBLICATIONS

3GPP TSG RAN WG1 Meeting #79 R1-144799, "Consideration on frequency hopping for MTC UEs",Panasonic,Nov. 17-21, 2014,total 3 pages.

3GPP TS 36.211 V12.6.0 (Jun. 2015);3rd Generation Partnership Project;Technical Specification Group Radio Access Network;Evolved Universal Terrestrial Radio Access (E-UTRA);Physical channels and modulation(Release 12),total 136 pages.

3GPP TS 36.331 V12.7.0 (Sep. 2015);3rd Generation Partnership Project;Technical Specification Group Radio Access Network;Evolved Universal Terrestrial Radio Access (E-UTRA);Radio Resource Control (RRC);Protocol specification (Release 12),total 453 pages.

R1-154567 InterDigital, "On PUCCH for MTC UE",3GPP TSG RAN WG1 Meeting #82,Beijing, China, Aug. 24-28, 2015,total 3 pages.

R1-154244 LG Electronics, "Discussion on data overlapping and simultaneous transmission and reception for MTC UEs",3GPP TSG RAN WG1 Meeting #82,Beijing, China, Aug. 24-28, 2015,,total 6 pages.

R1-151266 Huawei, HiSilicon, "PUSCH for MTC and coverage enhancement",3GPP TSG RAN WG1 Meeting #80bis, Belgrade, Serbia, Apr. 20-24, 2015,total 3 pages.

* cited by examiner

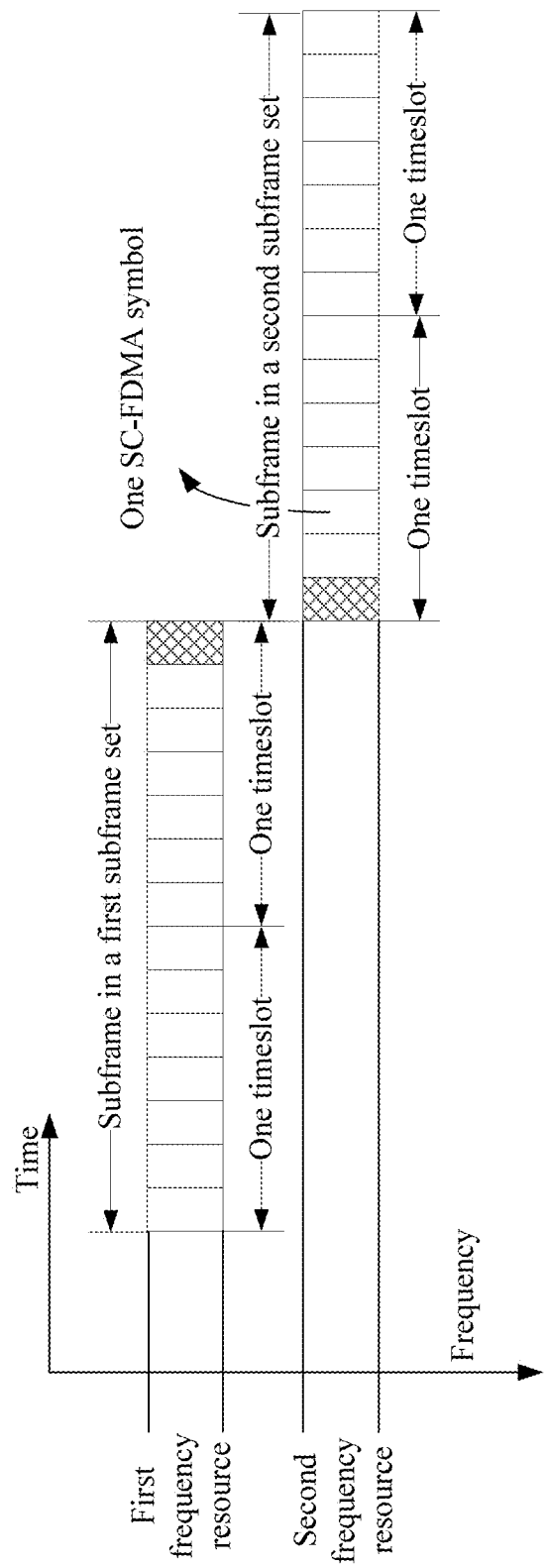
FIG. 5-a

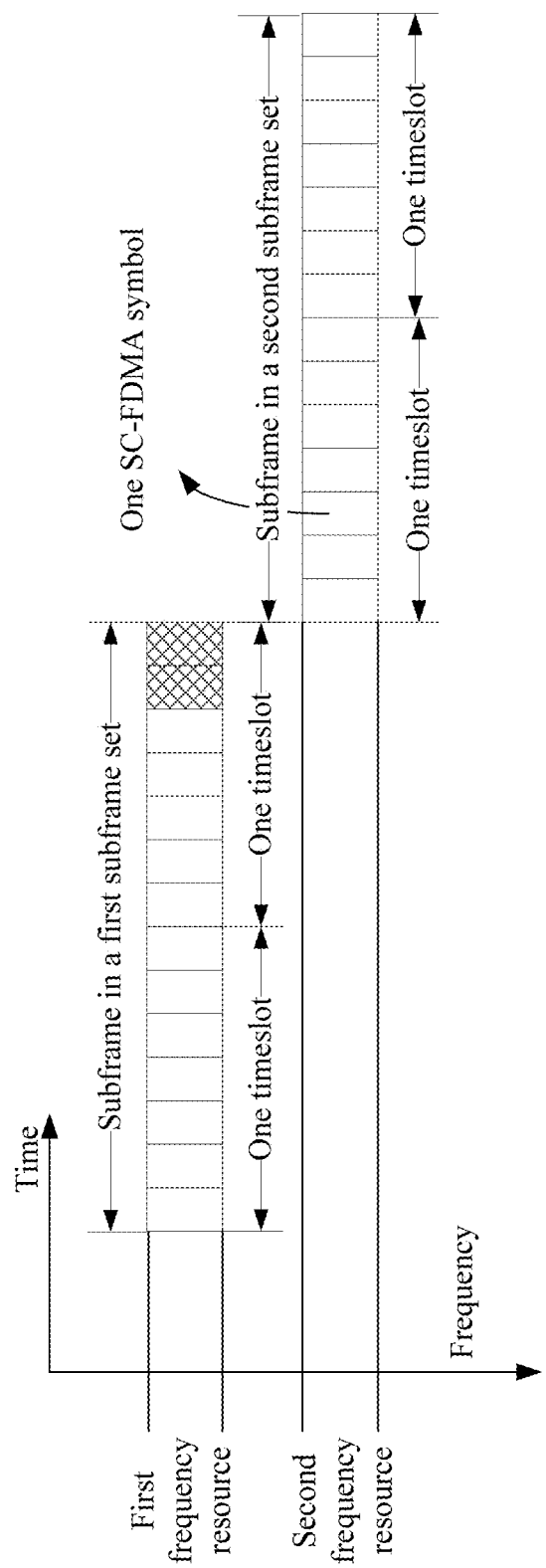
FIG. 5-b

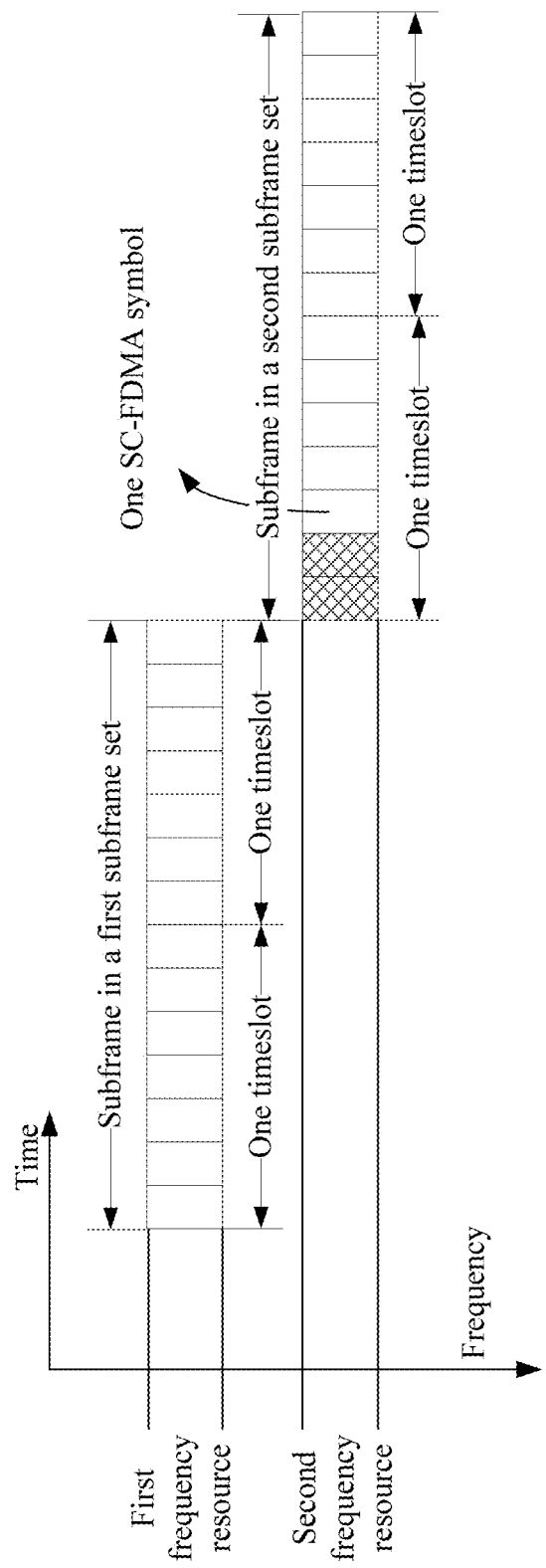
FIG. 5-c

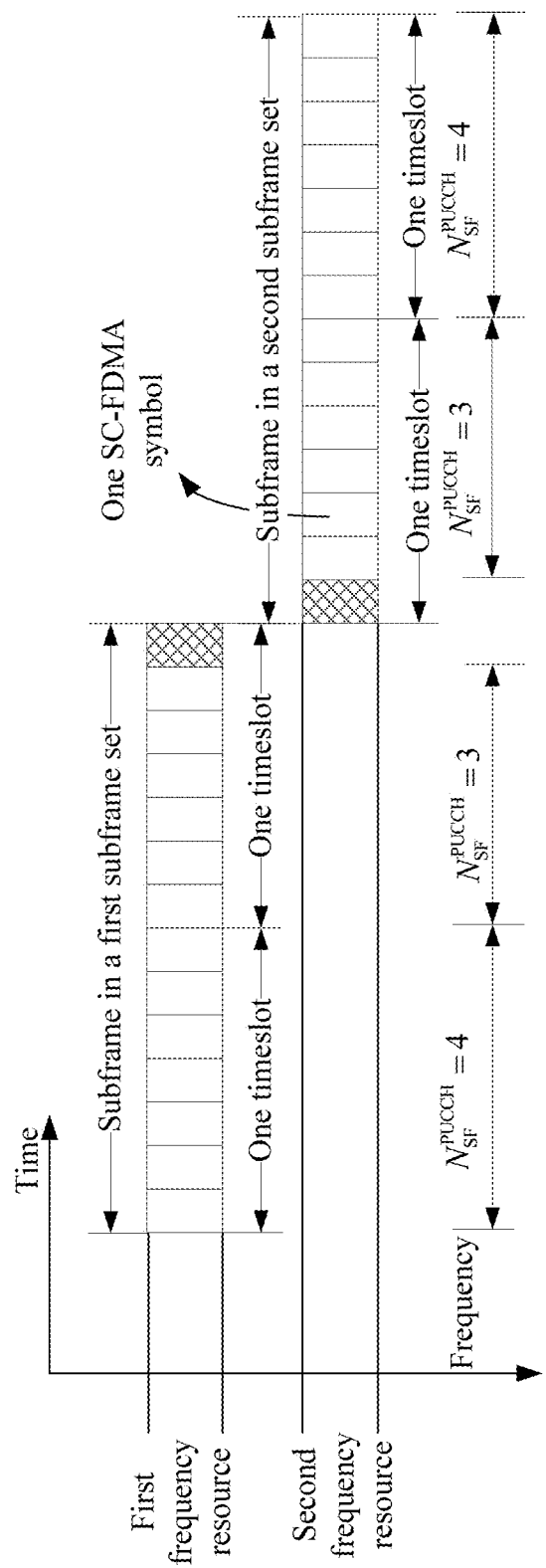
FIG. 5-d

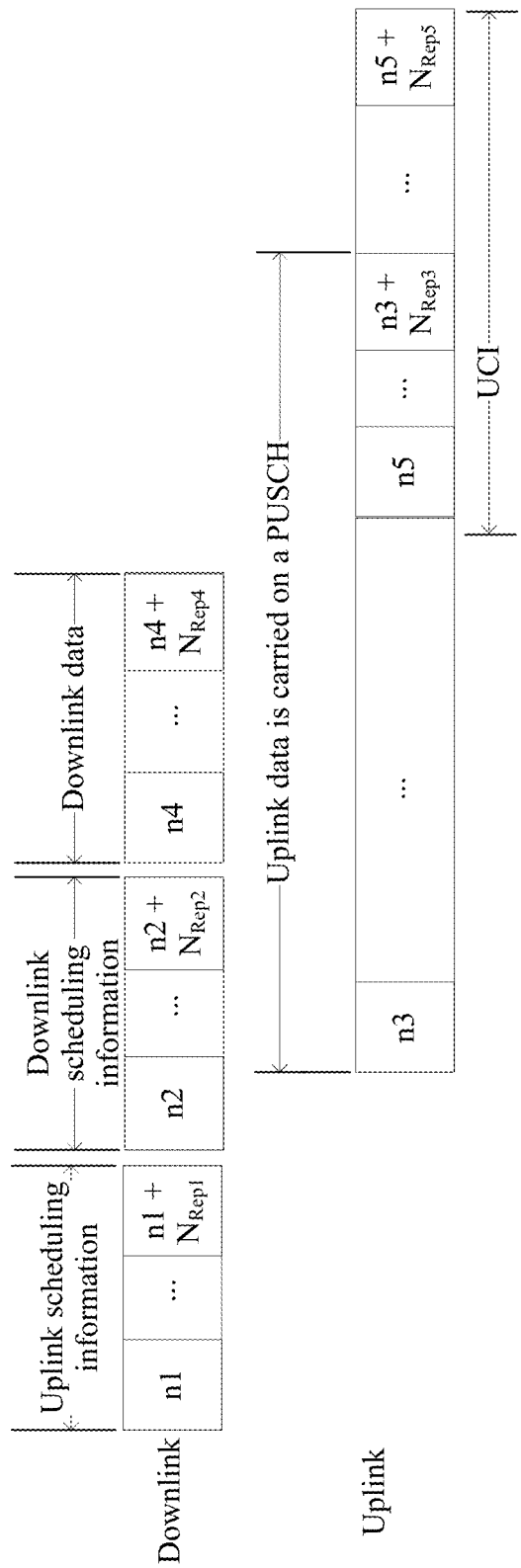
FIG. 6-a

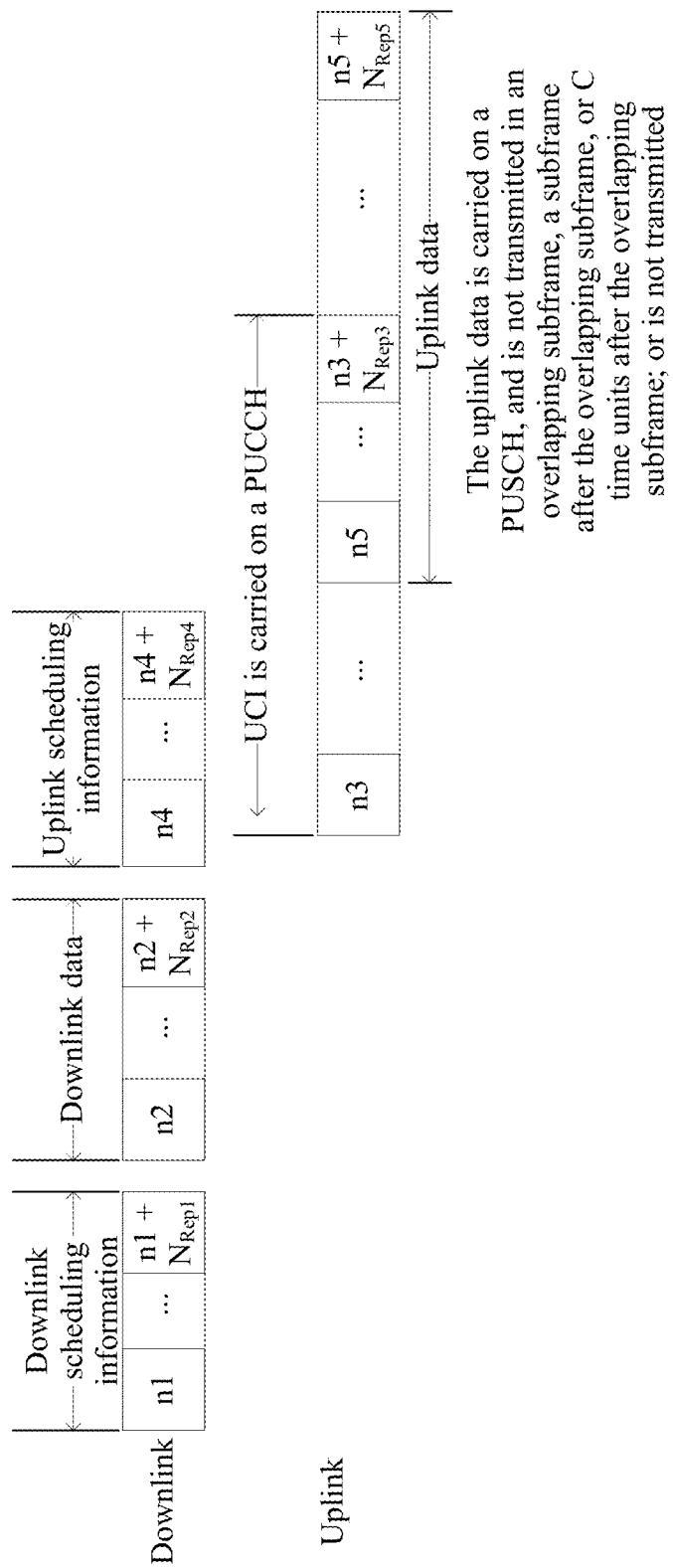
FIG. 6-b

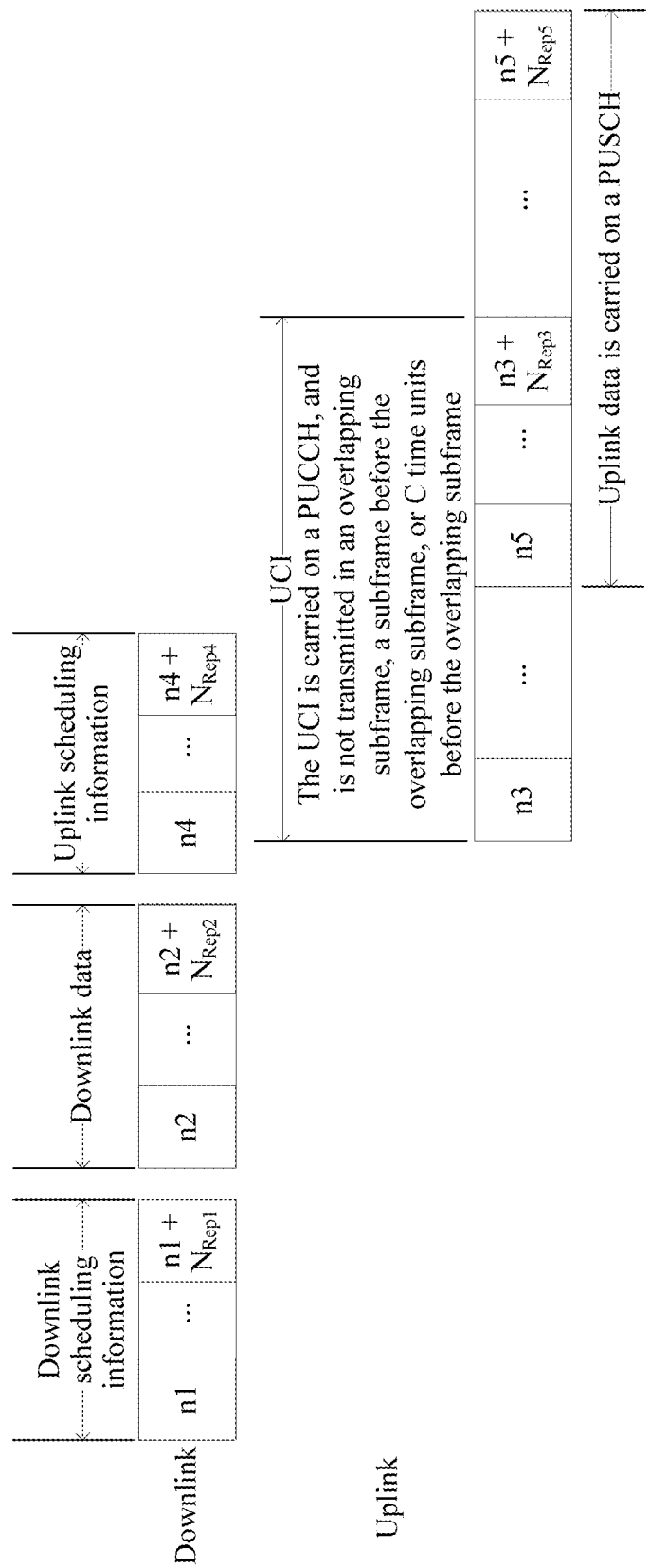
FIG. 6-c

UPLINK INFORMATION TRANSMISSION METHOD, BASE STATION, AND USER EQUIPMENT

CROSS-REFERENCE TO RELATED APPLICATIONS

This application is a continuation of International Application No. PCT/CN2015/090817, filed on Sep. 25, 2015, the disclosure of which is hereby incorporated by reference in its entirety.

TECHNICAL FIELD

Embodiments of the present invention relate to the communications field, and in particular, to an uplink information transmission method, a base station, and user equipment.

BACKGROUND

During machine type communication (Machine Type Communication, MTC), there are a large quantity of user equipments (User Equipment); therefore, it is required to reduce UE complexity or costs. Reducing signal receiving and sending bandwidth supported by UE is one of main technologies used to reduce UE complexity or costs. For example, the signal receiving or sending bandwidth for the UE is merely 1.4 MHz. However, an existing Long Term Evolution (Long Term Evolution, LTE) or Long Term Evolution Advanced (Long Term Evolution Advanced, LTE-A) system specifies six types of system bandwidth: 1.4 MHz, 3 MHz, 5 MHz, 10 MHz, 15 MHz, and 20 MHz. Therefore, when system bandwidth is greater than or equal to signal receiving or sending bandwidth for low-complexity or low-cost UE, the UE also needs to be capable of performing communication.

A resource in LTE system bandwidth is divided into subcarriers in a frequency domain. An LTE system resource is divided into radio frames (or, system frames) in a time domain. One radio frame is 10 ms. One radio frame includes two 5 ms half-frames. One radio frame includes 10 subframes. One subframe has a length of 1 ms and includes two timeslots. Single-carrier frequency-division multiple access (Single-carrier Frequency-Division Multiple Access, SC-FDMA) is used in uplink of an LTE system. Each timeslot includes six or seven SC-FDMA symbols. One physical resource block (Physical Resource Block, PRB) includes 12 subcarriers in the frequency domain. One PRB occupies one timeslot in the time domain.

The LTE system supports two frame structures: Type 1 and Type 2. Type 1 is used for frequency division duplex (Frequency Division Duplex, FDD), and Type 2 is used for time division duplex (Time Division Duplex, TDD). For the frame structure Type 1 in FDD, each subframe included in a 10 ms radio frame may be used to transmit both downlink information and uplink information. For the frame structure Type 2 in TDD, a subframe included in a 10 ms radio frame is a downlink subframe, an uplink subframe, or a special subframe. Which subframe is specifically a downlink subframe, an uplink subframe, or a special subframe is determined according to an uplink-downlink configuration. LTE TDD supports seven different uplink-downlink configuration options.

When low-complexity or low-cost UE uses an LTE system to perform communication, a frequency resource in LTE system bandwidth may be divided into narrowbands. A frequency width of a frequency resource included in a narrowband does not exceed operating bandwidth supported by the UE. For example, a frequency width of a narrowband is merely 1.4 MHz or is a frequency width of six PRBs.

When a quantity of narrowbands in the system bandwidth is greater than 1, during transmission of uplink information in MTC, switching may be performed between different narrowbands. A time of a maximum of two symbols is required for frequency adjustment when switching is performed between different narrowbands during information transmission of low-complexity or low-cost UE.

In the prior art, when switching is performed between different narrowbands during transmission of uplink information in MTC, a subframe is reserved without being used to transmit the uplink information, and is used by low-complexity or low-cost UE to adjust a frequency. The uplink information of the UE is transmitted in a first narrowband of a first subframe and a second narrowband of a second subframe, and there is at least one interval subframe between the first subframe and the second subframe. In the interval subframe, the UE adjusts a frequency between the first narrowband and the second narrowband, and does not send the uplink information.

The interval subframe in the prior art is at least 1 ms, far greater than a frequency adjustment time of a maximum of two symbols that is required when switching is performed between the different narrowbands during uplink information transmission of the low-complexity or low-cost UE. This brings an unnecessary transmission delay to uplink information transmission. In addition, reserving the interval subframe leads to resource division in a time dimension. This increases resource scheduling complexity of a base station.

SUMMARY

Embodiments of the present invention provide an uplink information transmission method, a base station, and user equipment, to reduce an unnecessary uplink information transmission delay, and avoid an increase in resource scheduling complexity of a base station.

According to a first aspect, an embodiment of the present invention provides an uplink information transmission method, including:

sending, by user equipment (UE), first uplink information on a first frequency resource of a first subframe set; and sending, by the UE, second uplink information on a second frequency resource of a second subframe set, where the first frequency resource and the second frequency resource are frequency resources included in two different narrowbands; and a radio frame in which a subframe in the first subframe set is located is different from a radio frame in which a subframe in the second subframe set is located, and any subframe included in the first subframe set and any subframe included in the second subframe set belong to different radio frames; or a half-frame in which a subframe in the first subframe set is located is different from a half-frame in which a subframe in the second subframe set is located, and any subframe included in the first subframe set and any subframe included in the second subframe set belong to different half-frames.

With reference to the first aspect, in a first possible implementation of the first aspect, the radio frame in which the subframe in the first subframe set is located and the radio frame in which the subframe in the second subframe set is located are adjacent different radio frames, or the half-frame in which the subframe in the first subframe set is located and the half-frame in which the subframe in the second subframe set is located are adjacent different half-frames.

With reference to the first aspect, or the first possible implementation of the first aspect, in a second possible implementation of the first aspect, there is only a downlink subframe and/or a special subframe between the first subframe set and the second subframe set that are in a time division duplex (TDD) system.

With reference to the first aspect, or the first or the second possible implementation of the first aspect, in a third possible implementation of the first aspect, a start subframe for sending the first uplink information on the first frequency resource is the first available uplink subframe in a radio frame or in a half-frame; and/or a start subframe for sending the second uplink information on the second frequency resource is the first available uplink subframe in a radio frame or in a half-frame; and/or a frequency hopping granularity for sending the first uplink information and/or the second uplink information is 5×M subframes, where M is a preconfigured positive integer.

With reference to the first aspect, or the first or the second or the third possible implementation of the first aspect, in a fourth possible implementation of the first aspect, an information type of the first uplink information is the same as an information type of the second uplink information.

According to a second aspect, an embodiment of the present invention provides an uplink information transmission method, including:

sending, by user equipment (UE), first uplink information on a first frequency resource of a first subframe set; and sending, by the UE, second uplink information on a second frequency resource of a second subframe set, where the first frequency resource and the second frequency resource are frequency resources included in different narrowbands, and the last subframe in the first subframe set and a start subframe in the second subframe set are adjacent subframes; and the first uplink information is not sent in the last A time units of the last subframe in the first subframe set, and/or the second uplink information is not sent in the first B time units of the start subframe in the second subframe set, where A and B are natural numbers (non-negative integers).

With reference to the second aspect, in a first possible implementation of the second aspect, A=1, and B=1; or A=2, and B=0; or A=0, and B=2.

With reference to the second aspect, or the first possible implementation of the second aspect, in a second possible implementation of the second aspect, the first uplink information and the second uplink information are two pieces of uplink information carried on a physical uplink control channel, the first uplink information is transmitted in the last subframe in the first subframe set by using a shortened physical uplink control channel format, and the second uplink information is transmitted in the start subframe in the second subframe set by using a shortened physical uplink control channel format.

With reference to the second aspect, or the first or the second possible implementation of the second aspect, in a third possible implementation of the second aspect, when the first uplink information is a random access preamble, B=0; or when the second uplink information is a random access preamble, A=0.

According to a third aspect, an embodiment of the present invention provides an uplink information transmission method, including:

receiving, by a base station, first uplink information on a first frequency resource of a first subframe set; and receiving, by the base station, second uplink information on a second frequency resource of a second subframe set, where the first frequency resource and the second frequency resource are frequency resources included in two different narrowbands; and a radio frame in which a subframe in the first subframe set is located is different from a radio frame in which a subframe in the second subframe set is located, and any subframe included in the first subframe set and any subframe included in the second subframe set belong to different radio frames; or a half-frame in which a subframe in the first subframe set is located is different from a half-frame in which a subframe in the second subframe set is located, and any subframe included in the first subframe set and any subframe included in the second subframe set belong to different half-frames.

With reference to the third aspect, in a first possible implementation of the third aspect, the radio frame in which the subframe in the first subframe set is located and the radio frame in which the subframe in the second subframe set is located are adjacent different radio frames, or the half-frame in which the subframe in the first subframe set is located and the half-frame in which the subframe in the second subframe set is located are adjacent different half-frames.

With reference to the third aspect, or the first possible implementation of the third aspect, in a second possible implementation of the third aspect, there is only a downlink subframe and/or a special subframe between the first subframe set and the second subframe set that are in a time division duplex (TDD) system.

With reference to the third aspect, or the first or the second possible implementation of the third aspect, in a third possible implementation of the third aspect, a start subframe for receiving the first uplink information on the first frequency resource is the first available uplink subframe in a radio frame or in a half-frame; and/or a start subframe for receiving the second uplink information on the second frequency resource is the first available uplink subframe in a radio frame or in a half-frame; and/or a frequency hopping granularity for receiving the first uplink information and/or the second uplink information is 5×M subframes, where M is a preconfigured positive integer.

With reference to the third aspect, or the first or the second or the third possible implementation of the third aspect, in a fourth possible implementation of the third aspect, an information type of the first uplink information is the same as an information type of the second uplink information.

According to a fourth aspect, an embodiment of the present invention provides an uplink information transmission method, including:

receiving, by a base station, first uplink information on a first frequency resource of a first subframe set; and receiving, by the base station, second uplink information on a second frequency resource of a second subframe set, where the first frequency resource and the second frequency resource are frequency resources included in different narrowbands, and the last subframe in the first subframe set and a start subframe in the second subframe set are adjacent subframes; and the first uplink information is not received in the last A time units of the last subframe in the first subframe set, and/or the second uplink information is not received in the first B time units of the start subframe in the second subframe set, where A and B are natural numbers (non-negative integers).

With reference to the fourth aspect, in a first possible implementation of the fourth aspect, A=1, and B=1; or
A=2, and B=0; or
A=0, and B=2.

With reference to the fourth aspect, or the first possible implementation of the fourth aspect, in a second possible implementation of the fourth aspect, the first uplink information and the second uplink information are two pieces of uplink information carried on a physical uplink control channel, the first uplink information is transmitted in the last subframe in the first subframe set by using a shortened physical uplink control channel format, and the second uplink information is transmitted in the start subframe in the second subframe set by using a shortened physical uplink control channel format.

With reference to the fourth aspect, or the first or the second possible implementation of the fourth aspect, in a third possible implementation of the fourth aspect, when the first uplink information is a random access preamble, B=0; or
when the second uplink information is a random access preamble, A=0.

According to a fifth aspect, an embodiment of the present invention provides user equipment, including:
a first sending module, configured to send first uplink information on a first frequency resource of a first subframe set; and
a second sending module, configured to send second uplink information on a second frequency resource of a second subframe set, where
the first frequency resource and the second frequency resource are frequency resources included in two different narrowbands; and
a radio frame in which a subframe in the first subframe set is located is different from a radio frame in which a subframe in the second subframe set is located, and any subframe included in the first subframe set and any subframe included in the second subframe set belong to different radio frames; or
a half-frame in which a subframe in the first subframe set is located is different from a half-frame in which a subframe in the second subframe set is located, and any subframe included in the first subframe set and any subframe included in the second subframe set belong to different half-frames.

With reference to the fifth aspect, in a first possible implementation of the fifth aspect, the radio frame in which the subframe in the first subframe set is located and the radio frame in which the subframe in the second subframe set is located are adjacent different radio frames, or the half-frame in which the subframe in the first subframe set is located and the half-frame in which the subframe in the second subframe set is located are adjacent different half-frames.

With reference to the fifth aspect, or the first possible implementation of the fifth aspect, in a second possible implementation of the fifth aspect, there is only a downlink subframe and/or a special subframe between the first subframe set and the second subframe set that are in a time division duplex (TDD) system.

With reference to the fifth aspect, or the first or the second possible implementation of the fifth aspect, in a third possible implementation of the fifth aspect, a start subframe for sending the first uplink information on the first frequency resource is the first available uplink subframe in a radio frame or in a half-frame; and/or
a start subframe for sending the second uplink information on the second frequency resource is the first available uplink subframe in a radio frame or in a half-frame; and/or
a frequency hopping granularity for sending the first uplink information and/or the second uplink information is 5× M subframes, where M is a preconfigured positive integer.

With reference to the fifth aspect, or the first or the second or the third possible implementation of the fifth aspect, in a fourth possible implementation of the fifth aspect, an information type of the first uplink information is the same as an information type of the second uplink information.

According to a sixth aspect, an embodiment of the present invention provides user equipment, including:
a first sending module, configured to send first uplink information on a first frequency resource of a first subframe set; and
a second sending module, configured to send second uplink information on a second frequency resource of a second subframe set, where
the first frequency resource and the second frequency resource are frequency resources included in different narrowbands, and the last subframe in the first subframe set and a start subframe in the second subframe set are adjacent subframes; and
the first uplink information is not sent in the last A time units of the last subframe in the first subframe set, and/or the second uplink information is not sent in the first B time units of the start subframe in the second subframe set, where A and B are natural numbers (non-negative integers).

With reference to the sixth aspect, in a first possible implementation of the sixth aspect, A=1, and B=1; or
A=2, and B=0; or
A=0, and B=2.

With reference to the sixth aspect, or the first possible implementation of the sixth aspect, in a second possible implementation of the sixth aspect,
the first uplink information and the second uplink information are two pieces of uplink information carried on a physical uplink control channel, the first uplink information is transmitted in the last subframe in the first subframe set by using a shortened physical uplink control channel format, and the second uplink information is transmitted in the start subframe in the second subframe set by using a shortened physical uplink control channel format.

With reference to the sixth aspect, or the first or the second possible implementation of the sixth aspect, in a third possible implementation of the sixth aspect, when the first uplink information is a random access preamble, B=0; or
when the second uplink information is a random access preamble, A=0.

According to a seventh aspect, an embodiment of the present invention provides a base station, including:
a first receiving module, configured to receive first uplink information on a first frequency resource of a first subframe set; and
a second receiving module, configured to receive second uplink information on a second frequency resource of a second subframe set, where
the first frequency resource and the second frequency resource are frequency resources included in two different narrowbands; and
a radio frame in which a subframe in the first subframe set is located is different from a radio frame in which a subframe in the second subframe set is located, and any subframe included in the first subframe set and any subframe included in the second subframe set belong to different radio frames; or a half-frame in which a subframe in the first subframe set is located is different from a half-frame in which a subframe in the second subframe set is located, and any subframe included in the first subframe set and any subframe included in the second subframe set belong to different half-frames.

With reference to the seventh aspect, in a first possible implementation of the seventh aspect, the radio frame in which the subframe in the first subframe set is located and the radio frame in which the subframe in the second subframe set is located are adjacent different radio frames, or the half-frame in which the subframe in the first subframe set is located and the half-frame in which the subframe in the second subframe set is located are adjacent different half-frames.

With reference to the seventh aspect, or the first possible implementation of the seventh aspect, in a second possible implementation of the seventh aspect, there is only a downlink subframe and/or a special subframe between the first subframe set and the second subframe set that are in a time division duplex (TDD) system.

With reference to the seventh aspect, or the first or the second possible implementation of the seventh aspect, in a third possible implementation of the seventh aspect, a start subframe for receiving the first uplink information on the first frequency resource is the first available uplink subframe in a radio frame or in a half-frame; and/or a start subframe for receiving the second uplink information on the second frequency resource is the first available uplink subframe in a radio frame or in a half-frame; and/or a frequency hopping granularity for receiving the first uplink information and/or the second uplink information is 5× M subframes, where M is a preconfigured positive integer.

With reference to the seventh aspect, or the first or the second or the third possible implementation of the seventh aspect, in a fourth possible implementation of the seventh aspect, an information type of the first uplink information is the same as an information type of the second uplink information.

According to an eighth aspect, an embodiment of the present invention provides a base station, including:

a first receiving module, configured to receive first uplink information on a first frequency resource of a first subframe set; and a second receiving module, configured to receive second uplink information on a second frequency resource of a second subframe set, where the first frequency resource and the second frequency resource are frequency resources included in different narrowbands, and the last subframe in the first subframe set and a start subframe in the second subframe set are adjacent subframes; and the first uplink information is not received in the last A time units of the last subframe in the first subframe set, and/or the second uplink information is not received in the first B time units of the start subframe in the second subframe set, where A and B are natural numbers (non-negative integers).

With reference to the eighth aspect, in a first possible implementation of the eighth aspect, A=1, and B=1; or A=2, and B=0; or A=0, and B=2.

With reference to the eighth aspect, or the first possible implementation of the eighth aspect, in a second possible implementation of the eighth aspect, the first uplink information and the second uplink information are two pieces of uplink information carried on a physical uplink control channel, the first uplink information is transmitted in the last subframe in the first subframe set by using a shortened physical uplink control channel format, and the second uplink information is transmitted in the start subframe in the second subframe set by using a shortened physical uplink control channel format.

With reference to the eighth aspect, or the first or the second possible implementation of the eighth aspect, in a third possible implementation of the eighth aspect, when the first uplink information is a random access preamble, B=0; or when the second uplink information is a random access preamble, A=0.

From the foregoing technical solutions, it can be seen that the embodiments of the present invention have the following advantages:

In the embodiments of the present invention, the UE sends the first uplink information on the first frequency resource of the first subframe set, and the UE sends the second uplink information on the second frequency resource of the second subframe set. The first frequency resource and the second frequency resource are frequency resources included in two different narrowbands. A radio frame in which a subframe in the first subframe set is located is different from a radio frame in which a subframe in the second subframe set is located, and any subframe included in the first subframe set and any subframe included in the second subframe set belong to different radio frames; or a half-frame in which a subframe in the first subframe set is located is different from a half-frame in which a subframe in the second subframe set is located, and any subframe included in the first subframe set and any subframe included in the second subframe set belong to different half-frames. In the embodiments of the present invention, because the first uplink information and the second uplink information are respectively sent by using the first subframe set and the second subframe set that are different, the UE needs to switch between different narrowbands after sending the first uplink information. In the embodiments of the present invention, it is specified that radio frames (or half-frames) in which subframes in two subframe sets (that is, the first subframe set and the second subframe set) are located are different, and any subframe in the first subframe set and any subframe in the second subframe set belong to different radio frames (or half-frames). Therefore, in the embodiments of the present invention, between the subframe in the first subframe set and the subframe in the second subframe set, there is already an interval in which the UE does not send uplink information, and the UE can perform narrowband switching by using the interval between the subframe in the first subframe set and the subframe in the second subframe set. Different from a prior-art manner in which an additional subframe is reserved as an interval subframe, the embodiments of the present invention can avoid an unnecessary uplink information transmission delay, and avoid an increase in resource scheduling complexity of a base station.

BRIEF DESCRIPTION OF DRAWINGS

FIG. 5-a is a schematic diagram of another type of uplink information transmission according to an embodiment of the present invention;

FIG. 5-b is a schematic diagram of another type of uplink information transmission according to an embodiment of the present invention;

FIG. 5-c is a schematic diagram of another type of uplink information transmission according to an embodiment of the present invention;

FIG. 5-d is a schematic diagram of another type of uplink information transmission according to an embodiment of the present invention;

FIG. 6-a is a schematic diagram of a processing procedure in which multiple subframes to be used to transmit uplink data overlap with multiple subframes to be used to transmit uplink control information (UCI) according to an embodiment of the present invention;

FIG. 6-b is a schematic diagram of another processing procedure in which multiple subframes to be used to transmit uplink data overlap with multiple subframes to be used to transmit UCI according to an embodiment of the present invention;

FIG. 6-c is a schematic diagram of another processing procedure in which multiple subframes to be used to transmit uplink data overlap with multiple subframes to be used to transmit UCI according to an embodiment of the present invention;

DESCRIPTION OF EMBODIMENTS

Figure 1:
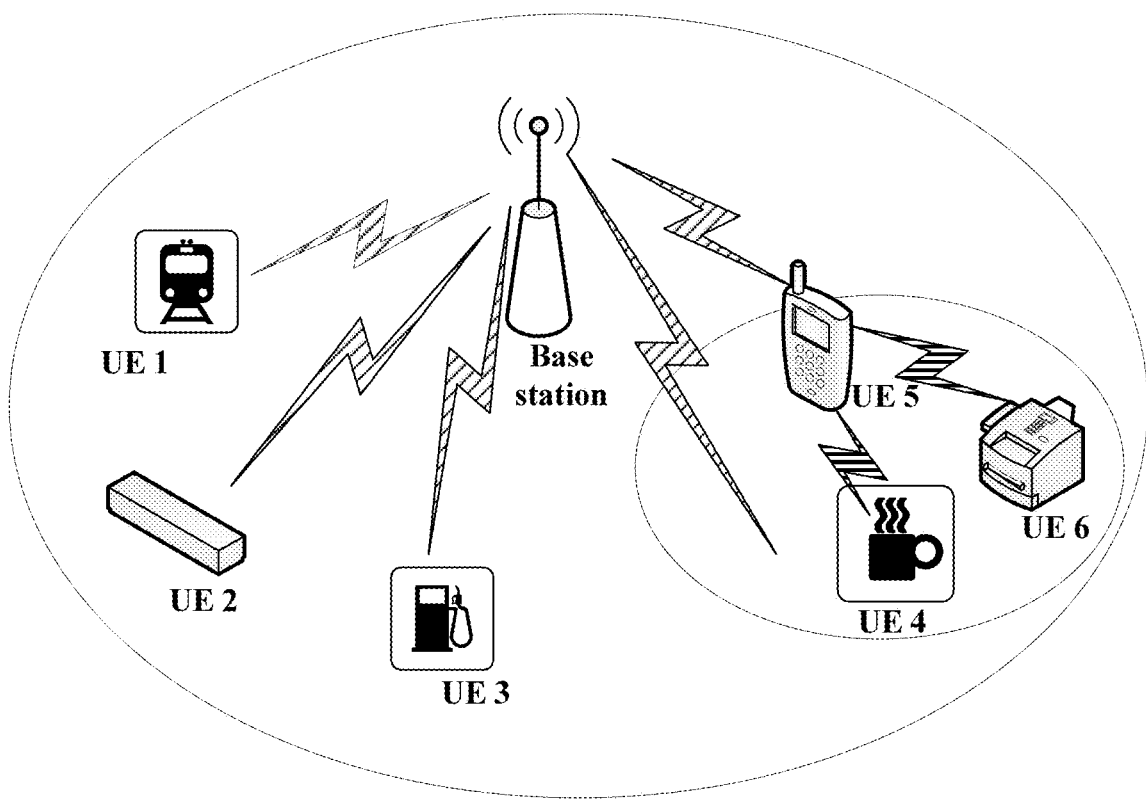
FIG. 1 is a diagram of a system architecture in which an uplink information transmission method is applied to a communications system according to the present invention.

The embodiments of the present invention provide an uplink information transmission method, a base station, and user equipment, to reduce an unnecessary uplink information transmission delay, and avoid an increase in resource scheduling complexity of a base station.

To make the invention objectives, features, and advantages of the present invention clearer and more comprehensible, the following clearly describes the technical solutions in the embodiments of the present invention with reference to the accompanying drawings in the embodiments of the present invention. The embodiments described in the following are some, rather than all, of the embodiments of the present invention. Other embodiments may be obtained by persons skilled in the art in possession of the present disclosure, based on the embodiments of the present invention and fall within the protection scope of the present invention.

In the specification, claims, and accompanying drawings of the present invention, the terms "first," "second," and so on are intended to distinguish between similar objects but do not necessarily indicate a particular order or sequence. It should be understood that the terms used in such a way are interchangeable in proper circumstances, and this is merely a discrimination manner used when objects having a same attribute are described in the embodiments of the present invention. In addition, the terms "including," "comprising," and any other variants mean to cover a non-exclusive inclusion, so that a process, method, system, product, or device that includes a series of units is not necessarily limited to those units, but may include other units not expressly listed or inherent to such a process, method, product, or device.

First, a system architecture used for an uplink information transmission method in the present invention is briefly described. The present invention is mainly applied to an LTE system or a Long Term Evolution Advanced (LTE-A, LTE Advanced) system. The present invention may also be applied to another communications system, for example, a Wideband Code Division Multiple Access (Wideband Code Division Multiple Access, WCDMA) system or a Time Division Synchronous Code Division Multiple Access (Time Division Synchronous Code Division Multiple Access, TD-SCDMA) system, provided that an entity that can send information exists in the communications system and another entity that can receive information exists in the communications system.

Transmission in the embodiments of the present invention may be sending or receiving. If transmission of a device on a side is sending, transmission of a communications device, corresponding to the device on the side, on another side is receiving; or if transmission of a device on a side is receiving, transmission of a communications device, corresponding to the device on the side, on another side is sending. Coverage enhancement in the embodiments of the present invention may be implemented in one or more of repeated transmission, spread spectrum transmission, retransmission, time interval bundling—based transmission, narrowband (for example, subcarrier scheduling) transmission, ultra-narrowband (for example, bandwidth ranges from tens of hertz to over ten kilohertz) transmission, power spectrum density boosting—based transmission, requirement relaxed transmission, or continuously attempted transmission. A low-cost terminal or a low-complexity terminal means that operating bandwidth of a terminal device is less than operating bandwidth of a non-low-cost terminal or a non-low-complexity terminal. The operating bandwidth may be one or more of processing bandwidth, radio frequency processing bandwidth, or baseband processing bandwidth.

Referring to FIG. 1, FIG. 1 is a diagram of a system architecture in which an uplink information transmission method is applied to a communications system according to the present invention. As shown in FIG. 1, a base station and user equipment (UE, User Equipment) 1 to UE 6 form a communications system. In the communications system, the base station receives uplink information sent by one or more of the UE 1 to the UE 6. The base station is a receive-end device in the uplink information transmission method in the present invention. The UE 1 to the UE 6 are transmit-end devices in the uplink information transmission method in the present invention. In addition, the UE 4 to the UE 6 also form a communications system. In the communications system, the UE 5 may function as a base station. The UE 5 may receive uplink information sent by one or more of the UE 4 or the UE 6.

The following separately provides descriptions in detail.

Figure 2:
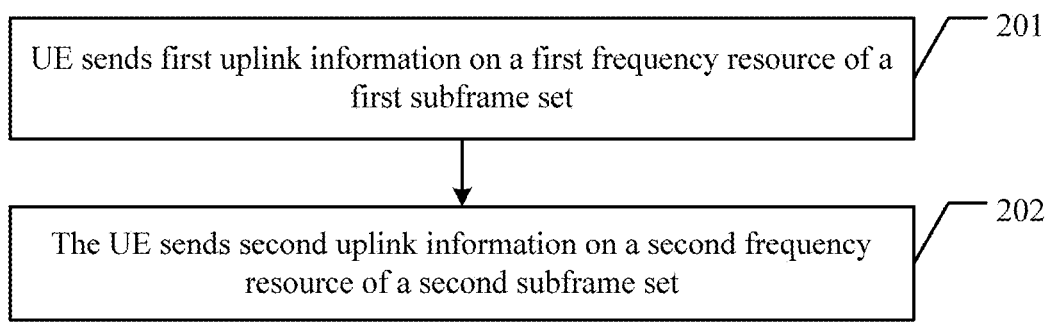
FIG. 2 is a schematic block flowchart of an uplink information transmission method according to an embodiment of the present invention.

An embodiment of an uplink information transmission method in the present invention may be applied to a scenario in which UE sends uplink information to a base station. Referring to FIG. 2, the uplink information transmission method may include the following operations:

201. UE sends first uplink information on a first frequency resource of a first subframe set.

202. The UE sends second uplink information on a second frequency resource of a second subframe set.

The first frequency resource and the second frequency resource are frequency resources included in two different narrowbands.

A radio frame in which a subframe in the first subframe set is located is different from a radio frame in which a subframe in the second subframe set is located, and any subframe included in the first subframe set and any subframe included in the second subframe set belong to different radio frames; or a half-frame in which a subframe in the first subframe set is located is different from a half-frame in which a subframe in the second subframe set is located, and any subframe included in the first subframe set and any subframe included in the second subframe set belong to different radio frames.

In this embodiment of the present invention, the UE may send uplink information by using different frequency resources in the two subframe sets separately. Specifically, in this embodiment of the present invention, there are the first subframe set and the second subframe set. Each subframe set may include at least one subframe. For example, there may be only one subframe in a subframe set, or there may be multiple subframes in a subframe set. All subframes included in a same subframe set may belong to a same radio frame, or may belong to different radio frames. Similarly, all subframes included in a same subframe set may belong to a same half-frame, or may belong to different half-frames. This is not limited in this embodiment of the present invention.

In this embodiment of the present invention, the first uplink information is sent by using the first frequency resource of the first subframe set, and the second uplink information is sent by using the second frequency resource of the second subframe set. In addition, a location relationship between a subframe in the first subframe set and a subframe in the second subframe set is described in detail in this embodiment of the present invention. Subframes in the two subframe sets satisfy the following relationships: (1) a radio frame (or a half-frame) in which a subframe in the first subframe set is located is different from a radio frame (or a half-frame) in which a subframe in the second subframe set is located; and (2) any subframe included in the first subframe set and any subframe included in the second subframe set belong to different radio frames (or half-frames).

In this embodiment of the present invention, only after a radio frame or a half-frame changes, a narrowband in which a frequency resource used by the UE to send uplink information is located may be different from a narrowband in which a frequency resource, in a previous radio frame or half-frame, used by the UE to send uplink information. It should be noted that, after a radio frame or a half-frame changes, a narrowband in which a frequency resource used by the UE to send uplink information is located may alternatively be the same as a narrowband in which a frequency resource, in a previous radio frame or half-frame, used by the UE to send uplink information. In all subframes of a radio frame or a half-frame, all narrowbands in which frequency resources used by the UE to send uplink information are located are the same. For example, operating bandwidth is 1.4 MHz (or 200 kHz, or 180 kHz). In a subframe, low-complexity or low-cost UE is capable of receiving or sending a signal only in one narrowband. The narrowband is a frequency resource with a particular frequency width. The narrowband may include one or more subcarriers (for example, a subcarrier width is 15 kHz, 2.5 kHz, or 3.75 kHz), or may include one or more resource blocks. A width of the narrowband may be operating bandwidth.

In some embodiments of the present invention, a radio frame in which a subframe in the first subframe set is located and a radio frame in which a subframe in the second subframe set is located are adjacent different radio frames, or a half-frame in which a subframe in the first subframe set is located and a half-frame in which a subframe in the second subframe set is located are adjacent different half-frames.

It should be noted that a subframe in the first subframe set or a subframe in the second subframe set may be located in one radio frame, or may be located in multiple radio frames. A subframe in the first subframe set or a subframe in the second subframe set may be located in one half-frame, or may be located in multiple half-frames.

If a subframe in the first subframe set is located in multiple radio frames and/or a subframe in the second subframe set is located in multiple radio frames, a radio frame included in the radio frames in which the subframe in the first subframe set is located and a radio frame in the radio frames in which the subframe in the second subframe set is located are two adjacent different radio frames.

If a subframe in the first subframe set is located in multiple half-frames and/or a subframe in the second subframe set is located in multiple half-frames, a half-frame included in the half-frames in which the subframe in the first subframe set is located and a half-frame in the half-frames in which the subframe in the second subframe set is located are two adjacent different half-frames. A narrowband in which a frequency resource used by the UE to send uplink information in a current radio frame is located is different from a narrowband in which a frequency resource used by the UE to send uplink information in an adjacent radio frame before the current radio frame (or after the current radio frame) is located. Alternatively, a narrowband in which a frequency resource used by the UE to send uplink information in a current half-frame is located is different from a narrowband in which a frequency resource used by the UE to send uplink information in an adjacent half-frame before (or after) the current half-frame is located.

In some embodiments of the present invention, the uplink information transmission method provided in this embodiment of the present invention is applied to a TDD system. For a time division duplex (TDD) system, there is only a downlink subframe and/or a special subframe between the first subframe set and the second subframe set. There is no uplink subframe between the first subframe set and the second subframe set. Therefore, the UE can adjust, by using a time of the downlink subframe and/or the special subframe, an operating frequency for sending uplink information, that is, adjusting a frequency resource for sending uplink information from the first frequency resource to the second frequency resource. Specifically, one or more of the following times may be used as the time occupied by the UE for adjusting the frequency resource for sending the uplink information from the first frequency resource to the second frequency resource: an uplink pilot timeslot (Uplink Pilot Timeslot, UpPTS) in the special subframe, a guard period (Guard Period, GP) in the special subframe, a downlink pilot timeslot (Downlink Pilot Timeslot, DownPTS) in the special subframe, the downlink subframe, a time for switching from uplink transmission to downlink transmission, or a time for switching from downlink transmission to uplink transmission.

Figure 3:
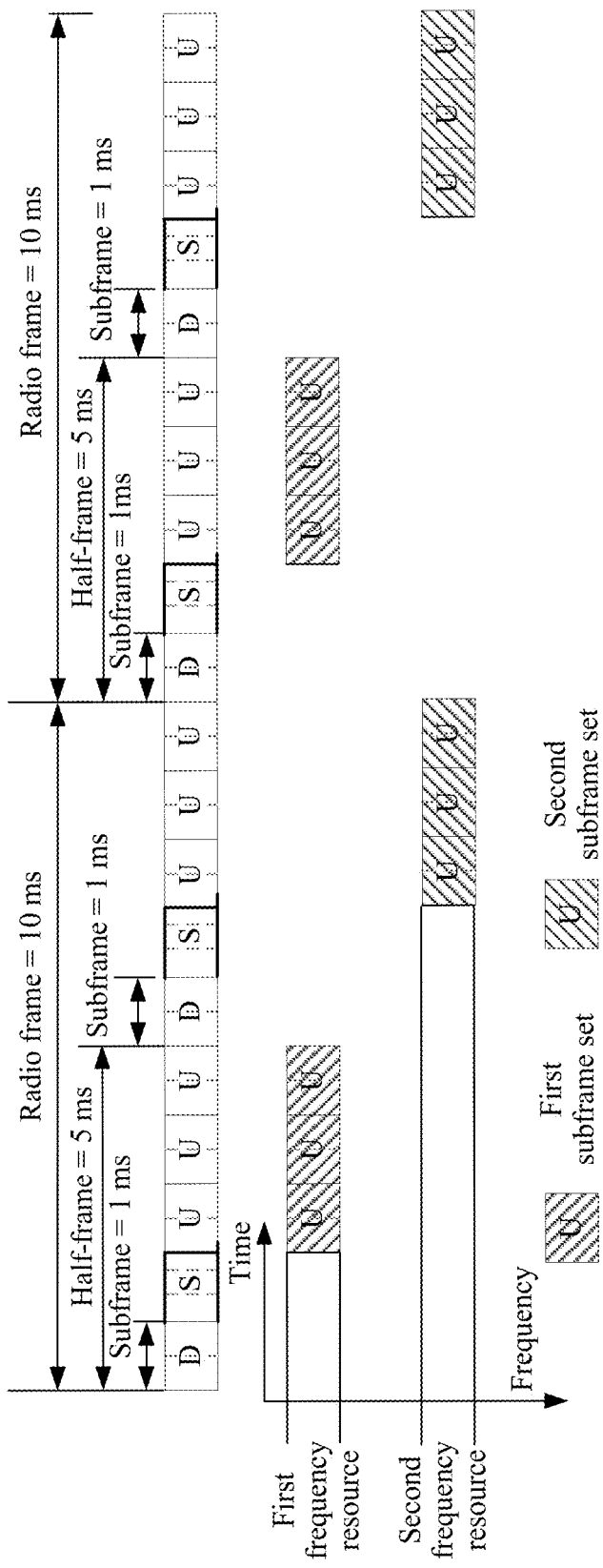
FIG. 3 is a schematic diagram of uplink information transmission according to an embodiment of the present invention.

An example is described below. For an uplink-downlink configuration 0 in the TDD system, referring to FIG. 3, FIG. 3 is a schematic diagram of uplink information transmission according to an embodiment of the present invention. In FIG. 3, in all subframes in a half-frame, narrowbands in which frequency resources for uplink information transmission are located are the same. A narrowband in which a frequency resource for uplink information transmission is located changes every other half-frame. Narrowbands in which frequency resources for uplink information transmission are located may be different only in different half-frames or radio frames.

In some embodiments of the present invention, a start subframe for sending the first uplink information on the first frequency resource is the first available uplink subframe in a radio frame or in a half-frame; and/or a start subframe for sending the second uplink information on the second frequency resource is the first available uplink subframe in a radio frame or in a half-frame; and/or a frequency hopping granularity for sending the first uplink information and/or the second uplink information is 5× M subframes, where M is a preconfigured positive integer.

When the frequency resource used by the UE to send uplink information changes, a start subframe used by the UE to send uplink information by using a changed frequency resource is the first available uplink subframe in a radio frame or in a half-frame. For example, a change of the frequency resource used by the UE to send the uplink information is a change from the first frequency resource to the second frequency resource. In this case, the start subframe for sending the second uplink information on the second frequency resource is the first available uplink subframe in a radio frame or in a half-frame. For example, a change of the frequency resource used by the UE to send the uplink information is a change from the second frequency resource to the first frequency resource. In this case, the start subframe for sending the first uplink information on the first frequency resource is the first available uplink subframe in a radio frame or in a half-frame. For example, a change of the frequency resource used by the UE to send the uplink information includes both a change from the first frequency resource to the second frequency resource and a change from the second frequency resource to the first frequency resource. In this case, the start subframe for sending the first uplink information on the first frequency resource is the first available uplink subframe in a radio frame or in a half-frame, and the start subframe for sending the second uplink information on the second frequency resource is the first available uplink subframe in a radio frame or in a half-frame. It should be noted that the start subframe used by the UE to send the uplink information may be any available uplink subframe in a radio frame or in a half-frame. The available uplink subframe is an uplink subframe that can be used to transmit uplink information. Specific implementation of an available uplink subframe needs to be determined with reference to an application scenario. The available uplink subframe may be generally the first uplink subframe in a radio frame or in a half-frame, or may not be the first uplink subframe. For example, the available uplink subframe may be the second uplink subframe in a radio frame or in a subframe.

In addition, the change of the frequency resource used by the UE to send the uplink information is referred to as frequency hopping for sending the uplink information. That a frequency hopping granularity for sending the uplink information is 5× M subframes means that the frequency resource used to send the uplink information changes every 5× M subframes. Each of the 5× M subframes may be 1 ms. Certainly, a subframe size in another communications protocol system may be flexibly configured. If a subframe is 1 ms, the frequency resource used to send the uplink information changes every 5× M ms. For example,M=1, orM=2.

In this embodiment of the present invention, an information type of the uplink information may be uplink data, uplink control information (UCI), or a random access preamble. An information type of the first uplink information may be the same as an information type of the second uplink information. This embodiment is applicable to a change of a frequency resource used by the UE to send uplink information of a same information type. It should be noted that an information type of the first uplink information may alternatively be different from an information type of the second uplink information. This embodiment is further applicable to a change of a frequency resource used by the UE to send uplink information of different information types. For example, an LTE uplink physical channel is an uplink control channel, an uplink shared channel, or a random access channel. Different uplink channels are used to carry different uplink information. The uplink information may include uplink data, uplink control information (Uplink control information, UCI), or a random access preamble. For example, the uplink data is carried on a physical uplink shared channel (Physical Uplink Shared Channel, PUSCH), the UCI is carried on a physical uplink control channel PUCCH (Physical uplink control channel) or a PUSCH, or the random access preamble is carried on a physical random access channel PRACH (Physical Random Access channel).

From the foregoing descriptions about the example of the present invention, it can be seen that, for the TDD system, in this embodiment of the present invention, a narrowband for uplink information transmission may be different from a narrowband for uplink information transmission that is in a previous radio frame or half-frame only after a radio frame or a half-frame changes. Therefore, the UE can adjust an uplink information sending frequency by using a guard period for uplink and downlink switching, a downlink subframe, or a special subframe. In this case, no additional subframe needs to be reserved as an interval subframe. This avoids an unnecessary uplink information transmission delay, and avoids an increase in resource scheduling complexity of a base station. The guard period is an uplink and downlink switching interval. The UE may switch between different narrowbands in the guard period. Therefore, no additional interval subframe needs to be allocated to the UE.

From the descriptions about the present invention in the foregoing embodiment, it can be seen that the UE sends the first uplink information on the first frequency resource of the first subframe set, and the UE sends the second uplink information on the second frequency resource of the second subframe set. The first frequency resource and the second frequency resource are frequency resources included in two different narrowbands. A radio frame in which a subframe in the first subframe set is located is different from a radio frame in which a subframe in the second subframe set is located, and any subframe included in the first subframe set and any subframe included in the second subframe set belong to different radio frames; or a half-frame in which a subframe in the first subframe set is located is different from a half-frame in which a subframe in the second subframe set is located, and any subframe included in the first subframe set and any subframe included in the second subframe set belong to different half-frames. In this embodiment of the present invention, because the first uplink information and the second uplink information are respectively sent by using the first subframe set and the second subframe set that are different, the UE needs to switch between different narrowbands after sending the first uplink information. In this embodiment of the present invention, it is specified that radio frames (or half-frames) in which subframes in two subframe sets (that is, the first subframe set and the second subframe set) are located are different, and any subframe in the first subframe set and any subframe in the second subframe set belong to different radio frames (or half-frames). Therefore, in this embodiment of the present invention, between the subframe in the first subframe set and the subframe in the second subframe set, there is already an interval in which the UE does not send uplink information, and the UE can perform narrowband switching by using the interval between the subframe in the first subframe set and the subframe in the second subframe set. Different from a prior-art manner in which an additional subframe is reserved as an interval subframe, this embodiment of the present invention can avoid an unnecessary uplink information transmission delay, and avoid an increase in resource scheduling complexity of a base station.

Figure 4:
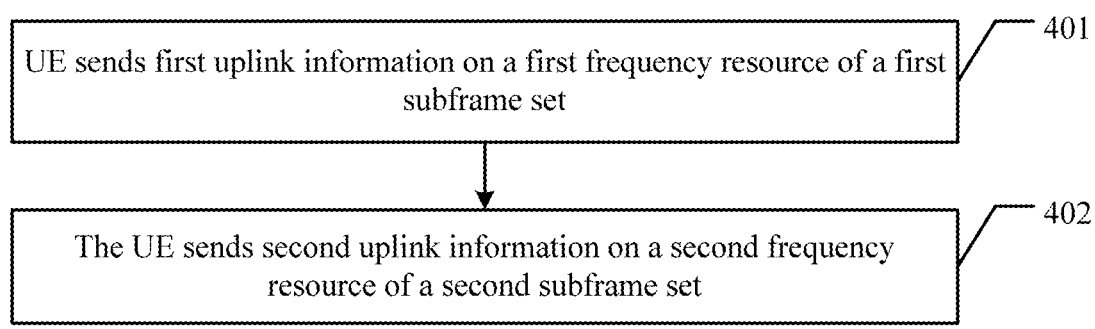
FIG. 4 is a schematic block flowchart of another uplink information transmission method according to an embodiment of the present invention.

The foregoing embodiment describes the uplink information transmission method implemented on a UE side. The following describes another uplink information transmission method implemented on a UE side. Referring to FIG. 4, an uplink information transmission method provided in an embodiment of the present invention includes the following operations:

401. UE sends first uplink information on a first frequency resource of a first subframe set.

402. The UE sends second uplink information on a second frequency resource of a second subframe set.

The first frequency resource and the second frequency resource are frequency resources included in different narrowbands. The last subframe in the first subframe set and a start subframe in the second subframe set are adjacent subframes.

The first uplink information is not sent in the last A time units of the last subframe in the first subframe set, and/or the second uplink information is not sent in the first B time units of the start subframe in the second subframe set, where A and B are natural numbers (non-negative integers).

In this embodiment of the present invention, the UE may send uplink information by using different frequency resources in the two subframe sets separately. Specifically, in this embodiment of the present invention, there are the first subframe set and the second subframe set. Each subframe set may include at least one subframe. For example, there may be only one subframe in a subframe set, or there may be multiple subframes in a subframe set. All subframes included in a same subframe set may belong to a same radio frame, or may belong to different radio frames. Similarly, all subframes included in a same subframe set may belong to a same half-frame, or may belong to different half-frames. This is not limited in this embodiment of the present invention.

In this embodiment of the present invention, the first uplink information is sent by using the first frequency resource of the first subframe set, and the second uplink information is sent by using the second frequency resource of the second subframe set. In addition, a location relationship between a subframe in the first subframe set and a subframe in the second subframe set is described in detail in this embodiment of the present invention. Subframes in the two subframe sets satisfy the following relationship: The last subframe in the first subframe set and the start subframe in the second subframe set are adjacent subframes. The last subframe in the first subframe set and the start subframe in the second subframe set are two temporally adjacent subframes. In addition, in this embodiment of the present invention, it is further described that the first uplink information is not sent in the last A time units of the last subframe in the first subframe set, and/or the second uplink information is not sent in the first B time units of the start subframe in the second subframe set. The last subframe in the first subframe set in this embodiment of the present invention includes multiple time units. A time unit in this embodiment of the present invention is a component of a subframe. Specifically, the time unit may be a symbol, or may be Ts. For example, Ts=1/(15000×2048) seconds. Further, the symbol is an SC-FDMA symbol, or a symbol in another multiple access mode. Because no uplink information is sent in the A time units and/or the B time units, the A time units and/or the B time units are used to adjust a frequency resource used by the UE to send uplink information.

In an implementation of the present invention, A=1, and B=1. An example is described below. There is one subframe in the first subframe set, there is one subframe in the second subframe set, a time unit is one SC-FDMA symbol, and one subframe includes 14 SC-FDMA symbols. Referring to FIG. 5-a, FIG. 5-a is a schematic diagram of another type of uplink information transmission according to an embodiment of the present invention. In FIG. 5-a, UE does not send uplink information in two symbols in a shaded part. The two symbols in the shaded part may be used by the UE to adjust a frequency.

In another implementation of the present invention, A=2, and B=0. An example is described below. There is one subframe in the first subframe set, there is one subframe in the second subframe set, a time unit is one SC-FDMA symbol, and one subframe includes 14 SC-FDMA symbols. Referring to FIG. 5-b, FIG. 5-b is a schematic diagram of another type of uplink information transmission according to an embodiment of the present invention. In FIG. 5-b, UE does not send uplink information in two symbols in a shaded part. The two symbols in the shaded part may be used by the UE to adjust a frequency.

In another implementation of the present invention, A=0, and B=2. An example is described below. There is one subframe in the first subframe set, there is one subframe in the second subframe set, a time unit is one SC-FDMA symbol, and one subframe includes 14 SC-FDMA symbols. Referring to FIG. 5-c, FIG. 5-c is a schematic diagram of another type of uplink information transmission according to an embodiment of the present invention. Uplink information transmission in this implementation is shown in FIG. 5-c.

UE does not send uplink information in two symbols in a shaded part. The two symbols in the shaded part are used by the UE to adjust a frequency.

In some embodiments of the present invention, the uplink information transmission method shown in FIG. 4 and provided in this embodiment of the present invention is applied to an FDD system. In this embodiment, uplink information or an information type of uplink information may be uplink data, uplink control information, or a random access preamble. An information type of the first uplink information is the same as an information type of the second uplink information. This embodiment is applicable to a change of a frequency resource used by the UE to send uplink information of a same information type. It should be noted that an information type of the first uplink information can alternatively be different from an information type of the second uplink information. This embodiment is further applicable to a change of a frequency resource used by the UE to send uplink information of different information types.

When the first uplink information is uplink information carried on a physical uplink control channel, the first uplink information is transmitted in the last subframe in the first subframe set by using a shortened physical uplink control channel format. It should be noted that the first uplink information is transmitted in another subframe in the first subframe set by using a shortened physical uplink control channel format, or is not transmitted by using a shortened physical uplink control channel format, that is, the first uplink information is transmitted by using a normal physical uplink control channel format.

In the prior art, the shortened physical uplink control channel format is applied to a subframe including a sounding reference signal (Sounding Reference Signal, SRS). In the subframe including the SRS, a physical uplink control channel in a shortened physical uplink control channel format is not mapped to the last SC-FDMA symbol in the subframe. For the physical uplink control channel in the shortened physical uplink control channel format, when the format of the physical uplink control channel is 1, 1a, or 1b, in the first timeslot of the subframe, an orthogonal sequence used for the physical uplink control channel has a length of $N_{SF}^{PUCCH}=4$, and in the second timeslot of the subframe, an orthogonal sequence used for the physical uplink control channel has a length of $N_{SF}^{PUCCH}=3$.

For a physical uplink control channel in the normal physical uplink control channel format, in the first timeslot of a subframe, an orthogonal sequence used for the physical uplink control channel has a length of $N_{SF}^{PUCCH}=R$, and in the second timeslot of the subframe, an orthogonal sequence used for the physical uplink control channel has a length of $N_{SF}^{PUCCH}=R$, where R is a positive integer, and in an embodiment, R=4.

When the first uplink information is transmitted in the subframe in the first subframe set by using the shortened physical uplink control channel format, in the first timeslot of the subframe, an orthogonal sequence used for the physical uplink control channel in the shortened physical uplink control channel format has a length of $N_{SF}^{PUCCH}=P$, and in the second timeslot of the subframe, an orthogonal sequence used for the physical uplink control channel in the shortened physical uplink control channel format has a length of $N_{SF}^{PUCCH}=Q$, where P and Q are positive integers, andP>Q. For example, P=4, and Q=3. For example, the shortened physical uplink control channel format used for the first uplink information in the subframe in the first subframe set is the same as a prior-art shortened physical uplink control channel format.

When the second uplink information is uplink information carried on a physical uplink control channel, the second uplink information is transmitted in a start subframe in the second subframe set by using a shortened physical uplink control channel format. It should be noted that the second uplink information is transmitted in another subframe in the second subframe set by using a shortened physical uplink control channel format, or is not transmitted by using a shortened physical uplink control channel format, that is, the second uplink information is transmitted by using a normal physical uplink control channel format.

Specifically, when the second uplink information is transmitted in the subframe in the second subframe set by using the shortened physical uplink control channel format, in the first timeslot of the subframe, an orthogonal sequence used for the physical uplink control channel in the shortened physical uplink control channel format has a length of $N_{SF}^{PUCCH}=Q$, and in the second timeslot of the subframe, an orthogonal sequence used for the physical uplink control channel in the shortened physical uplink control channel format has a length of $N_{SF}^{PUCCH}=P$, where P and Q are positive integers, andP>Q. For example, P=4, and Q=3. Particularly, the shortened physical uplink control channel format used for the first uplink information in the subframe in the first subframe set is different from a prior-art shortened physical uplink control channel format.

Next, referring to FIG. 5-d, FIG. 5-d is a schematic diagram of another type of uplink information transmission according to an embodiment of the present invention. In an example in which there is one subframe in the first subframe set, there is one subframe in the second subframe set, a time unit is one SC-FDMA symbol, and one subframe includes 14 SC-FDMA symbols, the first uplink information is transmitted in the last subframe in the first subframe set by using a shortened physical uplink control channel format, and the second uplink information is transmitted in a start subframe in the second subframe set by using a shortened physical uplink control channel format.

Particularly, when the first uplink information is a random access preamble, B=0. The second uplink information starts to be sent in the first time unit of the start subframe in the second subframe set. Particularly, a format of the random access preamble is one of formats 1 to 3. Because a guard period in the last subframe of one or more subframes used to transmit a random access preamble in one of formats 1 to 3 is greater than a time length of two SC-FDMA symbols, no guard period used by the UE to adjust a frequency needs to be reserved in the start subframe in the second subframe set. The UE may adjust a frequency by using the guard period in the subframe used to transmit the random access preamble in one of formats 1 to 3.

Alternatively, particularly, when the first uplink information is a random access preamble, A=0. Sending of the first uplink information ends after the last time unit of the last subframe in the first subframe set (or a time occupied for transmitting the random access preamble in the last subframe) elapses.

Alternatively, particularly, when the first uplink information is a random access preamble, a format of the random access preamble is a format 0, A=1, and B=1. A guard period in a subframe used to transmit the random access preamble in the format 0 is less than a time length of two SC-FDMA symbols. Therefore, the first uplink information is not sent in the last time unit of the last subframe in the first subframe set, and the second uplink information is not sent in the first time unit of the start subframe in the second subframe set. The two time units are used as guard periods for the UE to adjust a frequency.

In this embodiment of the present invention, only the last A time units of the last subframe in the first subframe set and/or the first B time units of the start subframe in the second subframe set are used to adjust a frequency of UE, so that a time used to adjust a frequency is a maximum value of a frequency adjustment time required by the UE. In this case, no additional subframe needs to be reserved as an interval subframe. This avoids an unnecessary uplink information transmission delay, and avoids an increase in resource scheduling complexity of a base station. Further, in this embodiment of the present invention, the first uplink information and the second uplink information are two pieces of uplink information carried on a physical uplink control channel. The uplink information is transmitted by using a shortened physical uplink control channel format. Particularly, a length of an orthogonal sequence used for the physical uplink control channel in the shortened physical uplink control channel format is the same as that in the prior art. This helps ensure orthogonality of orthogonal sequences used for different PUCCHs, and ensures transmission performance of uplink information carried on a PUCCH.

In some embodiments of the present invention, when a frequency resource of a PUSCH and a frequency resource of a PUCCH are not in one narrowband, and multiple subframes to be used to transmit uplink data overlap with multiple subframes to be used to transmit uplink control information (Uplink Control Information, UCI) (the UCI includes hybrid automatic retransmission request feedback information (Hybrid automatic retransmission request)), the uplink information transmission method provided in this embodiment of the inventive solution includes the following:

If a start subframe to be used to transmit the uplink data is before a start subframe to be used to transmit the UCI, and an end subframe to be used to transmit the uplink data is after the start subframe to be used to transmit the UCI, the UCI is carried on a PUSCH, and the UCI is not transmitted when the uplink data is uplink data in a random access process; or the UCI is not transmitted; or the UCI is carried on a PUCCH, and the UCI is not transmitted in an overlapping subframe, a subframe after the overlapping subframe, or C time units after the overlapping subframe, where C is a natural number (non-negative integer). Referring to FIG. 6-a, FIG. 6-a is a schematic diagram of a processing procedure in which multiple subframes to be used to transmit uplink data overlap with multiple subframes to be used to transmit UCI according to an embodiment of the present invention. n1 to n1+NRep1 are used to transmit uplink scheduling information, n2 to n2+NRep2 are used to transmit downlink scheduling information, n4 to n4+NRep4 are used to transmit downlink data, n3 to n3+NRep3 are used to transmit uplink data, and n5 to n5+NRep5 are used to transmit UCI.

If a start subframe to be used to transmit the UCI is before a start subframe to be used to transmit the uplink data, and an end subframe to be used to transmit the UCI is after the start subframe to be used to transmit the uplink data, the UCI is carried on a PUCCH, and the uplink data is not transmitted in an overlapping subframe, a subframe after the overlapping subframe, or C time units after the overlapping subframe; or the uplink data is not transmitted. Referring to FIG. 6-b, FIG. 6-b is a schematic diagram of another processing procedure in which multiple subframes to be used to transmit uplink data overlap with multiple subframes to be used to transmit UCI according to an embodiment of the present invention. n1 to n1+NRep1 are used to transmit uplink scheduling information, n2 to n2+NRep2 are used to transmit downlink scheduling information, n4 to n4+NRep4 are used to transmit downlink data, n3 to n3+NRep3 are used to transmit UCI, and n5 to n5+NRep5 are used to transmit uplink data.

Alternatively, if a start subframe to be used to transmit UCI is before a start subframe to be used to transmit uplink data, and an end subframe to be used to transmit the UCI is after the start subframe to be used to transmit the uplink data, the UCI is carried on a PUCCH, and the UCI is not transmitted in an overlapping subframe, a subframe before the overlapping subframe, or C time units before the overlapping subframe. Referring to FIG. 6-c, FIG. 6-c is a schematic diagram of another processing procedure in which multiple subframes to be used to transmit uplink data overlap with multiple subframes to be used to transmit UCI according to an embodiment of the present invention. n1 to n1+NRep1 are used to transmit uplink scheduling information, n2 to n2+NRep2 are used to transmit downlink scheduling information, n4 to n4+NRep4 are used to transmit downlink data, n3 to n3+NRep3 are used to transmit UCI, and n5 to n5+NRep5 are used to transmit uplink data.

When multiple subframes to be used to transmit a random access preamble overlap with multiple subframes to be used to transmit the uplink data/UCI, the uplink information transmission method provided in this embodiment of the inventive solution includes:

If a start subframe to be used to transmit the random access preamble is before a start subframe to be used to transmit the uplink data/UCI, and an end subframe to be used to transmit the random access preamble is after the start subframe to be used to transmit the uplink data/UCI, the uplink data/UCI is not transmitted in an overlapping subframe, a subframe after the overlapping subframe, or C time units after the overlapping subframe; or the uplink data/UCI is not transmitted; or the uplink data/UCI is not transmitted in an overlapping subframe.

If a start subframe to be used to transmit the uplink data/UCI is before a start subframe to be used to transmit the random access preamble, and an end subframe to be used to transmit the uplink data/UCI is after the start subframe to be used to transmit the random access preamble, the uplink data/UCI is not transmitted in an overlapping subframe, a subframe before the overlapping subframe, or C time units before the overlapping subframe; or the uplink data/UCI is not transmitted.

In this embodiment, for a meaning of a time unit, refer to Embodiment 2. C is a natural number (non-negative integer). Particularly, C=1, and a time unit is one symbol. The subframe or the C time units that are after the overlapping subframe are temporally adjacent to the overlapping subframe. The subframe or the C time units that are before the overlapping subframe are temporally adjacent to the overlapping subframe.

According to this embodiment of the present invention, the UE is capable of transmitting uplink information according to a predefined priority when different uplink information cannot be simultaneously transmitted in subframes to be used to transmit the uplink information. This ensures transmission performance of uplink information with a high priority.

Figure 7:
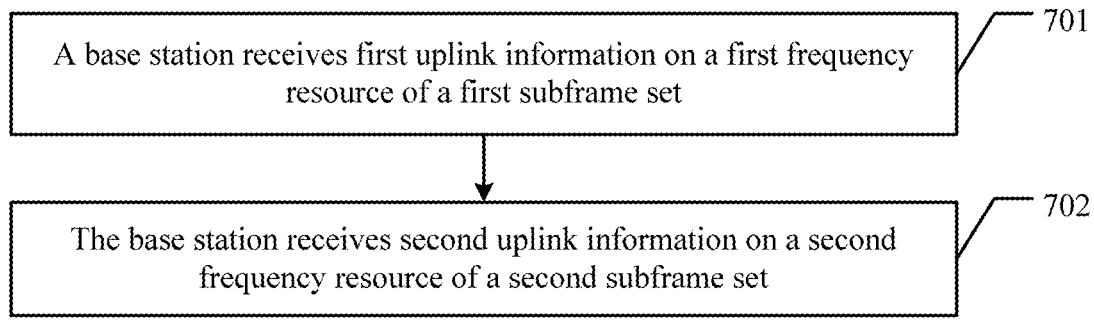
FIG. 7 is a schematic block flowchart of another uplink information transmission method according to an embodiment of the present invention.

The foregoing embodiments describe the uplink information transmission method on the UE side. The following describes an uplink information transmission method from a peer end (a base station) of UE according to the present invention. Referring to FIG. 7, the uplink information transmission method provided in another embodiment of the present invention may include the following operations:

701. A base station receives first uplink information on a first frequency resource of a first subframe set.

702. The base station receives second uplink information on a second frequency resource of a second subframe set.

The first frequency resource and the second frequency resource are frequency resources included in two different narrowbands.

A radio frame in which a subframe in the first subframe set is located is different from a radio frame in which a subframe in the second subframe set is located, and any subframe included in the first subframe set and any subframe included in the second subframe set belong to different radio frames; or a half-frame in which a subframe in the first subframe set is located is different from a half-frame in which a subframe in the second subframe set is located, and any subframe included in the first subframe set and any subframe included in the second subframe set belong to different half-frames.

In this embodiment of the present invention, the base station may receive uplink information by using different frequency resources in the two subframe sets separately. Specifically, in this embodiment of the present invention, there are the first subframe set and the second subframe set. Each subframe set may include at least one subframe. For example, there may be only one subframe in a subframe set, or there may be multiple subframes in a subframe set. All subframes included in a same subframe set may belong to a same radio frame, or may belong to different radio frames. Similarly, all subframes included in a same subframe set may belong to a same half-frame, or may belong to different half-frames. This is not limited in this embodiment of the present invention.

In this embodiment of the present invention, the first uplink information is received by using the first frequency resource of the first subframe set, and the second uplink information is received by using the second frequency resource of the second subframe set. In addition, a location relationship between a subframe in the first subframe set and a subframe in the second subframe set is described in detail in this embodiment of the present invention. Subframes in the two subframe sets satisfy the following relationships: (1) A radio frame (or a half-frame) in which a subframe in the first subframe set is located is different from a radio frame (or a half-frame) in which a subframe in the second subframe set is located. (2) Any subframe included in the first subframe set and any subframe included in the second subframe set belong to different radio frames (or half-frames).

In this embodiment of the present invention, only after a radio frame or a half-frame changes, a narrowband in which a frequency resource used by the base station to receive uplink information is located may be different from a narrowband in which a frequency resource, in a previous radio frame or half-frame, used by the base station to receive uplink information is located. It should be noted that, after a radio frame or a half-frame changes, a narrowband in which a frequency resource used by the base station to receive uplink information is located may alternatively be the same as a narrowband in which a frequency resource, in a previous radio frame or half-frame, used by the base station to receive uplink information is located. In all subframes of a radio frame or a half-frame, all narrowbands in which frequency resources used by the base station to receive uplink information are located are the same. The narrowband means that one or more frequency resources are included in a frequency domain. The frequency resource may be a subcarrier, or may be a frequency resource occupied by a PRB.

In some embodiments of the present invention, a radio frame in which a subframe in the first subframe set is located and a radio frame in which a subframe in the second subframe set is located are adjacent different radio frames, or a half-frame in which a subframe in the first subframe set is located and a half-frame in which a subframe in the second subframe set is located are adjacent different half-frames.

It should be noted that a subframe in the first subframe set or a subframe in the second subframe set may be located in one radio frame, or may be located in multiple radio frames. A subframe in the first subframe set or a subframe in the second subframe set may be located in one half-frame, or may be located in multiple half-frames.

If a subframe in the first subframe set is located in multiple radio frames and/or a subframe in the second subframe set is located in multiple radio frames, a radio frame included in the radio frames in which the subframe in the first subframe set is located and a radio frame in the radio frames in which the subframe in the second subframe set is located are two adjacent different radio frames.

If a subframe in the first subframe set is located in multiple half-frames and/or a subframe in the second subframe set is located in multiple half-frames, a half-frame included in the half-frames in which the subframe in the first subframe set is located and a half-frame in the half-frames in which the subframe in the second subframe set is located are two adjacent different half-frames.

A narrowband in which a frequency resource used by the base station to receive uplink information in a current radio frame is located is different from a narrowband in which a frequency resource used by the base station to receive uplink information in an adjacent radio frame before the current radio frame (or after the current radio frame) is located. Alternatively, a narrowband in which a frequency resource used by the base station to receive uplink information in a current half-frame is located is different from a narrowband in which a frequency resource used by the base station to receive uplink information in an adjacent half-frame before (or after) the current half-frame is located.

In some embodiments of the present invention, the uplink information transmission method provided in this embodiment of the present invention is applied to a TDD system. There is only a downlink subframe and/or a special subframe between the first subframe set and the second subframe set that are in the time division duplex (TDD) system. For the TDD system, there is only the downlink subframe and/or the special subframe between the first subframe set and the second subframe set. There is no uplink subframe between the first subframe set and the second subframe set. Therefore, the UE can adjust, by using a time of the downlink subframe and/or the special subframe, an operating frequency for sending uplink information, that is, adjusting a frequency resource for sending uplink information from the first frequency resource to the second frequency resource.

In some embodiments of the present invention, a start subframe for receiving the first uplink information on the first frequency resource is the first available uplink subframe in a radio frame or in a half-frame; and/or a start subframe for receiving the second uplink information on the second frequency resource is the first available uplink subframe in a radio frame or in a half-frame; and/or a frequency hopping granularity for receiving the first uplink information and/or the second uplink information is 5× M subframes, where M is a preconfigured positive integer.

When the frequency resource used by the base station to receive uplink information changes, a start subframe used by the base station to receive uplink information by using a changed frequency resource is the first available uplink subframe in a radio frame or in a half-frame. For example, a change of the frequency resource used by the base station to receive the uplink information is a change from the first frequency resource to the second frequency resource. In this case, the start subframe for receiving the second uplink information on the second frequency resource is the first available uplink subframe in a radio frame or in a half-frame. For example, a change of the frequency resource used by the base station to receive the uplink information is a change from the second frequency resource to the first frequency resource. In this case, the start subframe for receiving the first uplink information on the first frequency resource is the first available uplink subframe in a radio frame or in a half-frame. For example, a change of the frequency resource used by the base station to receive the uplink information includes both a change from the first frequency resource to the second frequency resource and a change from the second frequency resource to the first frequency resource. In this case, the start subframe for receiving the first uplink information on the first frequency resource is the first available uplink subframe in a radio frame or in a half-frame, and the start subframe for receiving the second uplink information on the second frequency resource is the first available uplink subframe in a radio frame or in a half-frame. It should be noted that the start subframe used by the base station to receive the uplink information may be any available uplink subframe in a radio frame or in a half-frame. The available uplink subframe is an uplink subframe that can be used to transmit uplink information. Specific implementation of an available uplink subframe needs to be determined with reference to an application scenario. The available uplink subframe may be generally the first uplink subframe in a radio frame or in a half-frame, or may not be the first uplink subframe. The available uplink subframe may be the second uplink subframe in a radio frame or in a subframe.

In this embodiment of the present invention, that a frequency hopping granularity for receiving the uplink information is 5× M subframes means that the frequency resource used to receive the uplink information changes every 5× M subframes. Each of the 5× M subframes may be 1 ms. Certainly, a subframe size in another communications protocol system may be flexibly configured. If a subframe is 1 ms, the frequency resource used to receive the uplink information changes every 5× M ms. For example, M=1, or M=2.

In this embodiment of the present invention, an information type of the uplink information may be uplink data, uplink control information UCI, or a random access preamble. An information type of the first uplink information is the same as an information type of the second uplink information. This embodiment is applicable to a change of a frequency resource used by the base station to receive uplink information of a same information type. It should be noted that an information type of the first uplink information may alternatively be different from an information type of the second uplink information. This embodiment is further applicable to a change of a frequency resource used by the base station to receive uplink information of different information types.

From the foregoing descriptions about the example of the present invention, it can be seen that, for the TDD system, the UE needs to perform uplink and downlink switching in each half-frame or each radio frame, and frequencies for sending uplink and downlink information are different. In this embodiment of the present invention, a narrowband for uplink information transmission may be different from a narrowband for uplink information transmission that is in a previous radio frame or half-frame only after a radio frame or a half-frame changes. Therefore, the UE can adjust an uplink information sending frequency by using a guard period for uplink and downlink switching, a downlink subframe, or a special subframe. The base station does not need to receive, in the guard period for uplink and downlink switching, the uplink information sent by the UE, and the UE performs narrowband switching by using the guard period for uplink and downlink switching. In this case, no additional subframe needs to be reserved as an interval subframe. This avoids an unnecessary uplink information transmission delay, and avoids an increase in resource scheduling complexity of a base station. The guard period is an uplink and downlink switching interval. The UE may switch between different narrowbands in the guard period. Therefore, no additional interval subframe needs to be allocated to the UE.

From the descriptions about the present invention in the foregoing embodiment, it can be seen that the base station receives the first uplink information on the first frequency resource of the first subframe set, and the base station receives the second uplink information on the second frequency resource of the second subframe set. The first frequency resource and the second frequency resource are frequency resources included in two different narrowbands. A radio frame in which a subframe in the first subframe set is located is different from a radio frame in which a subframe in the second subframe set is located, and any subframe included in the first subframe set and any subframe included in the second subframe set belong to different radio frames; or a half-frame in which a subframe in the first subframe set is located is different from a half-frame in which a subframe in the second subframe set is located, and any subframe included in the first subframe set and any subframe included in the second subframe set belong to different half-frames. In this embodiment of the present invention, because the first uplink information and the second uplink information are respectively sent by using the first subframe set and the second subframe set that are different, the base station needs to switch between different narrowbands after receiving the first uplink information. In this embodiment of the present invention, it is specified that radio frames (or half-frames) in which subframes in two subframe sets (that is, the first subframe set and the second subframe set) are located are different, and any subframe in the first subframe set and any subframe in the second subframe set belong to different radio frames (or half-frames). Therefore, in this embodiment of the present invention, between the subframe in the first subframe set and the subframe in the second subframe set, there is already an interval in which the UE does not send uplink information, and the UE can perform narrowband switching by using the interval between the subframe in the first subframe set and the subframe in the second subframe set. Different from a prior-art manner in which an additional subframe is reserved as an interval subframe, this embodiment of the present invention can avoid an unnecessary uplink information transmission delay, and avoid an increase in resource scheduling complexity of a base station.

Figure 8:
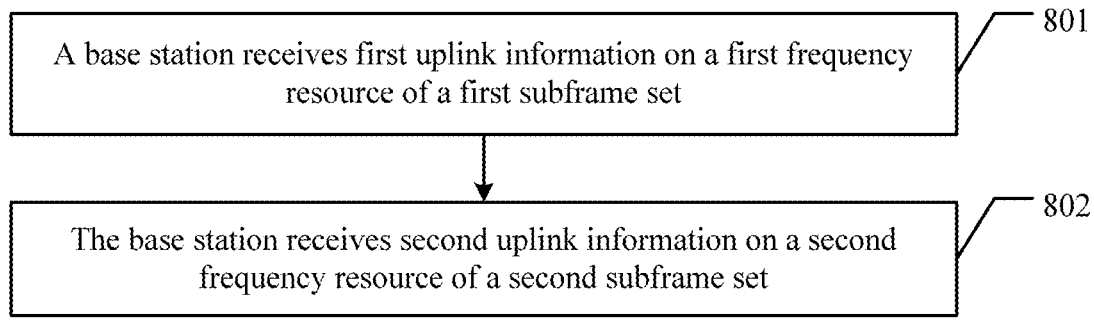
FIG. 8 is a schematic block flowchart of another uplink information transmission method according to an embodiment of the present invention.

The foregoing embodiment describes the uplink information transmission method implemented on a base station side. The following describes another uplink information transmission method implemented on a base station side. Referring to FIG. 8, the uplink information transmission method provided in an embodiment of the present invention includes the following operations:

801. A base station receives first uplink information on a first frequency resource of a first subframe set.

802. The base station receives second uplink information on a second frequency resource of a second subframe set.

The first frequency resource and the second frequency resource are frequency resources included in different narrowbands, and the last subframe in the first subframe set and a start subframe in the second subframe set are adjacent subframes.

The first uplink information is not received in the last A time units of the last subframe in the first subframe set, and/or the second uplink information is not received in the first B time units of the start subframe in the second subframe set, where A and B are natural numbers (non-negative integers).

In this embodiment of the present invention, the base station may receive uplink information by using different frequency resources in the two subframe sets separately. Specifically, in this embodiment of the present invention, there are the first subframe set and the second subframe set. Each subframe set may include at least one subframe. For example, there may be only one subframe in a subframe set, or there may be multiple subframes in a subframe set. All subframes included in a same subframe set may belong to a same radio frame, or may belong to different radio frames. Similarly, all subframes included in a same subframe set may belong to a same half-frame, or may belong to different half-frames. This is not limited in this embodiment of the present invention.

In this embodiment of the present invention, the first uplink information is received by using the first frequency resource of the first subframe set, and the second uplink information is received by using the second frequency resource of the second subframe set. In addition, a location relationship between a subframe in the first subframe set and a subframe in the second subframe set is described in detail in this embodiment of the present invention. Subframes in the two subframe sets satisfy the following relationship: The last subframe in the first subframe set and the start subframe in the second subframe set are adjacent subframes. The last subframe in the first subframe set and the start subframe in the second subframe set are two temporally adjacent subframes. In addition, in this embodiment of the present invention, it is further described that the first uplink information is not received in the last A time units of the last subframe in the first subframe set, and/or the second uplink information is not received in the first B time units of the start subframe in the second subframe set. The last subframe in the first subframe set in this embodiment of the present invention includes multiple time units. A time unit in this embodiment of the present invention is a component of a subframe. Specifically, the time unit may be a symbol, or may be Ts. Ts=1/(15000×2048) seconds. Further, the symbol is an SC-FDMA symbol, or a symbol in another multiple access mode. Because no uplink information is received in the A time units and/or the B time units, the A time units and/or the B time units are used to adjust a frequency resource used by the base station to receive uplink information.

In an implementation of the present invention, A=1, and B=1. An example is described below. There is one subframe in the first subframe set, there is one subframe in the second subframe set, a time unit is one SC-FDMA symbol, and one subframe includes 14 SC-FDMA symbols. Referring to FIG. 5-a, FIG. 5-a is a schematic diagram of another type of uplink information transmission according to an embodiment of the present invention. In FIG. 5-a, the base station does not receive uplink information in two symbols in a shaded part. The two symbols in the shaded part may be used by the UE to adjust a frequency.

In another implementation of the present invention, A=2, and B=0. An example is described below. There is one subframe in the first subframe set, there is one subframe in the second subframe set, a time unit is one SC-FDMA symbol, and one subframe includes 14 SC-FDMA symbols. Referring to FIG. 5-b, FIG. 5-b is a schematic diagram of another type of uplink information transmission according to an embodiment of the present invention. In FIG. 5-b, the base station does not receive uplink information in two symbols in a shaded part. The two symbols in the shaded part may be used by the UE to adjust a frequency.

In another implementation of the present invention, A=0, and B=2. An example is described below. There is one subframe in the first subframe set, there is one subframe in the second subframe set, a time unit is one SC-FDMA symbol, and one subframe includes 14 SC-FDMA symbols. Referring to FIG. 5-c, FIG. 5-c is a schematic diagram of another type of uplink information transmission according to an embodiment of the present invention. Uplink information transmission in this implementation is shown in FIG. 5-c. The base station does not receive uplink information in two symbols in a shaded part. The two symbols in the shaded part are used by the UE to adjust a frequency.

In some embodiments of the present invention, the uplink information transmission method shown in FIG. 8 and provided in this embodiment of the present invention is applied to an FDD system. In this embodiment, uplink information or an information type of uplink information may be uplink data, uplink control information UCI, or a random access preamble. An information type of the first uplink information is the same as an information type of the second uplink information. This embodiment is applicable to a change of a frequency resource used by the base station to receive uplink information of a same information type. It should be noted that an information type of the first uplink information may alternatively be different from an information type of the second uplink information. This embodiment is further applicable to a change of a frequency resource used by the base station to receive uplink information of different information types.

When the first uplink information is uplink information carried on a physical uplink control channel, the first uplink information is transmitted in the last subframe in the first subframe set by using a shortened physical uplink control channel format. It should be noted that the first uplink information is transmitted in another subframe in the first subframe set by using a shortened physical uplink control channel format, or is not transmitted by using a shortened physical uplink control channel format, that is, the first uplink information is transmitted by using a normal physical uplink control channel format.

In the prior art, the shortened physical uplink control channel format is applied to a subframe including an SRS. In the subframe including the SRS, a physical uplink control channel in a shortened physical uplink control channel format is not mapped to the last SC-FDMA symbol in the subframe. For the physical uplink control channel in the shortened physical uplink control channel format, when the format of the physical uplink control channel is 1, 1a, or 1b, in the first timeslot of the subframe, an orthogonal sequence used for the physical uplink control channel has a length of $N_{SF}^{PUCCH}=4$, and in the second timeslot of the subframe, an orthogonal sequence used for the physical uplink control channel has a length of $N_{SF}^{PUCCH}=3$.

For a physical uplink control channel in the normal physical uplink control channel format, in the first timeslot of a subframe, an orthogonal sequence used for the physical uplink control channel has a length of $N_{SF}^{PUCCH}=R$, and in the second timeslot of the subframe, an orthogonal sequence used for the physical uplink control channel has a length of $N_{SF}^{PUCCH}=R$, where R is a positive integer, and in an embodiment, R=4.

Specifically, when the first uplink information is transmitted in the subframe in the first subframe set by using the shortened physical uplink control channel format, in the first timeslot of the subframe, an orthogonal sequence used for the physical uplink control channel in the shortened physical uplink control channel format has a length of $N_{SF}^{PUCCH}=P$, and in the second timeslot of the subframe, an orthogonal sequence used for the physical uplink control channel in the shortened physical uplink control channel format has a length of $N_{SF}^{PUCCH}=Q$, where P and Q are positive integers, andP>Q. For example, P=4, and Q=3. The shortened physical uplink control channel format used for the first uplink information in the subframe in the first subframe set is the same as a prior-art shortened physical uplink control channel format.

When the second uplink information is uplink information carried on a physical uplink control channel, the second uplink information is transmitted in a start subframe in the second subframe set by using a shortened physical uplink control channel format. It should be noted that the second uplink information is transmitted in another subframe in the second subframe set by using a shortened physical uplink control channel format, or is not transmitted by using a shortened physical uplink control channel format, that is, the second uplink information is transmitted by using a normal physical uplink control channel format.

Specifically, when the second uplink information is transmitted in the subframe in the second subframe set by using the shortened physical uplink control channel format, in the first timeslot of the subframe, an orthogonal sequence used for the physical uplink control channel in the shortened physical uplink control channel format has a length of $N_{SF}^{PUCCH}=Q$, and in the second timeslot of the subframe, an orthogonal sequence used for the physical uplink control channel in the shortened physical uplink control channel format has a length of $N_{SF}^{PUCCH}=P$, where P and Q are positive integers, andP>Q. For example, P=4, and Q=3. The shortened physical uplink control channel format used for the first uplink information in the subframe in the first subframe set is different from a prior-art shortened physical uplink control channel format.

Next, referring to FIG. 5-d, FIG. 5-d is a schematic diagram of another type of uplink information transmission according to an embodiment of the present invention. In an example in which there is one subframe in the first subframe set, there is one subframe in the second subframe set, a time unit is one SC-FDMA symbol, and one subframe includes 14 SC-FDMA symbols, the first uplink information is transmitted in the last subframe in the first subframe set by using a shortened physical uplink control channel format, and the second uplink information is transmitted in a start subframe in the second subframe set by using a shortened physical uplink control channel format.

Particularly, when the first uplink information is a random access preamble, B=0. The second uplink information starts to be sent in the first time unit of the start subframe in the second subframe set. Particularly, a format of the random access preamble is one of formats 1 to 3. Because a guard period in the last subframe of one or more subframes used to transmit a random access preamble in one of formats 1 to 3 is greater than a time length of two SC-FDMA symbols, no guard period used by the UE to adjust a frequency needs to be reserved in the start subframe in the second subframe set. The UE may adjust a frequency by using the guard period in the subframe used to transmit the random access preamble in one of formats 1 to 3.

Alternatively, particularly, when the first uplink information is a random access preamble, A=0. Receiving of the first uplink information ends after the last time unit of the last subframe in the first subframe set elapses.

Alternatively, particularly, when the first uplink information is a random access preamble, a format of the random access preamble is a format 0, A=1, and B=1. A guard period in a subframe used to transmit the random access preamble in the format 0 is less than a time length of two SC-FDMA symbols. Therefore, the first uplink information is not sent in the last time unit of the last subframe in the first subframe set, and the second uplink information is not sent in the first time unit of the start subframe in the second subframe set. The two time units are used as guard periods for the UE to adjust a frequency.

In this embodiment of the present invention, only the last A time units of the last subframe in the first subframe set and/or the first B time units of the start subframe in the second subframe set are used to adjust a frequency of UE, so that a time used to adjust a frequency is a maximum value of a frequency adjustment time required by the UE. In this case, no additional subframe needs to be reserved as an interval subframe. This avoids an unnecessary uplink information transmission delay, and avoids an increase in resource scheduling complexity of a base station. Further, in this embodiment of the present invention, the first uplink information and the second uplink information are two pieces of uplink information carried on a physical uplink control channel. The uplink information is transmitted by using a shortened physical uplink control channel format. A length of an orthogonal sequence used for the physical uplink control channel in the shortened physical uplink control channel format is the same as that in the prior art. This helps ensure orthogonality of orthogonal sequences used for different PUCCHs, and ensures transmission performance of uplink information carried on a PUCCH.

It should be noted that, for ease of description, each of the foregoing method embodiments is described as a combination of a series of actions; however, persons skilled in the art should understand that, because some operations may be performed in another sequence or simultaneously according to the present invention, the present invention is not limited by the described action sequence. In addition, persons skilled in the art should also understand that all the embodiments described in this specification are examples of embodiments, and the included actions and modules are not necessarily mandatory to the present invention.

To better implement the foregoing solutions in the embodiments of the present invention, the following further provides related apparatuses for implementing the foregoing solutions.

Figure 9:
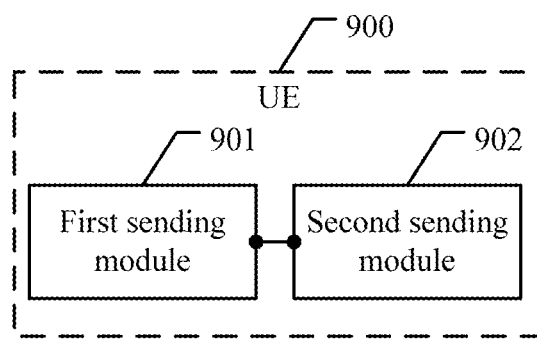
FIG. 9 is a schematic diagram of a composition structure of UE according to an embodiment of the present invention.

Referring to FIG. 9, UE 900 provided in an embodiment of the present invention may include a first sending module 901 and a second sending module 902.

The first sending module 901 is configured to send first uplink information on a first frequency resource of a first subframe set.

The second sending module 902 is configured to send second uplink information on a second frequency resource of a second subframe set.

The first frequency resource and the second frequency resource are frequency resources included in two different narrowbands.

A radio frame in which a subframe in the first subframe set is located is different from a radio frame in which a subframe in the second subframe set is located, and any subframe included in the first subframe set and any subframe included in the second subframe set belong to different radio frames; or a half-frame in which a subframe in the first subframe set is located is different from a half-frame in which a subframe in the second subframe set is located, and any subframe included in the first subframe set and any subframe included in the second subframe set belong to different half-frames.

In some embodiments of the present invention, the radio frame in which the subframe in the first subframe set is located and the radio frame in which the subframe in the second subframe set is located are adjacent different radio frames, or the half-frame in which the subframe in the first subframe set is located and the half-frame in which the subframe in the second subframe set is located are adjacent different half-frames.

In some embodiments of the present invention, there is only a downlink subframe and/or a special subframe between the first subframe set and the second subframe set that are in a time division duplex (TDD) system.

In some embodiments of the present invention, a start subframe for sending the first uplink information on the first frequency resource is the first available uplink subframe in a radio frame or in a half-frame; and/or a start subframe for sending the second uplink information on the second frequency resource is the first available uplink subframe in a radio frame or in a half-frame; and/or a frequency hopping granularity for sending the first uplink information and/or the second uplink information is 5× M subframes, where M is a preconfigured positive integer.

In some embodiments of the present invention, an information type of the first uplink information is the same as an information type of the second uplink information.

From the descriptions about the present invention in the foregoing embodiment, it can be seen that the UE sends the first uplink information on the first frequency resource of the first subframe set, and the UE sends the second uplink information on the second frequency resource of the second subframe set. The first frequency resource and the second frequency resource are frequency resources included in two different narrowbands. A radio frame in which a subframe in the first subframe set is located is different from a radio frame in which a subframe in the second subframe set is located, and any subframe included in the first subframe set and any subframe included in the second subframe set belong to different radio frames; or a half-frame in which a subframe in the first subframe set is located is different from a half-frame in which a subframe in the second subframe set is located, and any subframe included in the first subframe set and any subframe included in the second subframe set belong to different half-frames. In this embodiment of the present invention, because the first uplink information and the second uplink information are respectively sent by using the first subframe set and the second subframe set that are different, the UE needs to switch between different narrowbands after sending the first uplink information. In this embodiment of the present invention, it is specified that radio frames (or half-frames) in which subframes in two subframe sets (that is, the first subframe set and the second subframe set) are located are different, and any subframe in the first subframe set and any subframe in the second subframe set belong to different radio frames (or half-frames). Therefore, in this embodiment of the present invention, between the subframe in the first subframe set and the subframe in the second subframe set, there is already an interval in which the UE does not send uplink information, and the UE can perform narrowband switching by using the interval between the subframe in the first subframe set and the subframe in the second subframe set. Different from a prior-art manner in which an additional subframe is reserved as an interval subframe, this embodiment of the present invention can avoid an unnecessary uplink information transmission delay, and avoid an increase in resource scheduling complexity of a base station.

Figure 10:
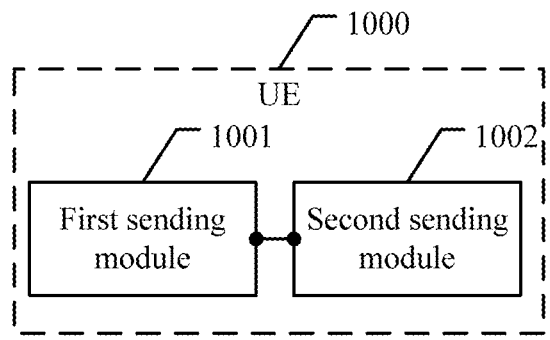
FIG. 10 is a schematic diagram of a composition structure of another UE according to an embodiment of the present invention.

Referring to FIG. 10, UE 1000 provided in an embodiment of the present invention may include a first sending module 1001 and a second sending module 1002.

The first sending module 1001 is configured to send first uplink information on a first frequency resource of a first subframe set.

The second sending module 1002 is configured to send second uplink information on a second frequency resource of a second subframe set.

The first frequency resource and the second frequency resource are frequency resources included in different narrowbands, and the last subframe in the first subframe set and a start subframe in the second subframe set are adjacent subframes.

The first uplink information is not sent in the last A time units of the last subframe in the first subframe set, and/or the second uplink information is not sent in the first B time units of the start subframe in the second subframe set, where A and B are natural numbers (non-negative integers).

In some embodiments of the present invention, A=1, and B=1; or

A=2, and B=0; or

A=0, and B=2.

In some embodiments of the present invention, the first uplink information and the second uplink information are two pieces of uplink information carried on a physical uplink control channel, the first uplink information is transmitted in the last subframe in the first subframe set by using a shortened physical uplink control channel format, and the second uplink information is transmitted in the start subframe in the second subframe set by using a shortened physical uplink control channel format.

In some embodiments of the present invention, when the first uplink information is a random access preamble, B=0; or when the second uplink information is a random access preamble, A=0.

In this embodiment of the present invention, only the last A time units of the last subframe in the first subframe set and/or the first B time units of the start subframe in the second subframe set are used to adjust a frequency of UE, so that a time used to adjust a frequency is a maximum value of a frequency adjustment time required by the UE. In this case, no additional subframe needs to be reserved as an interval subframe. This avoids an unnecessary uplink information transmission delay, and avoids an increase in resource scheduling complexity of a base station. Further, in this embodiment of the present invention, the first uplink information and the second uplink information are two pieces of uplink information carried on a physical uplink control channel. The uplink information is transmitted by using a shortened physical uplink control channel format. Particularly, a length of an orthogonal sequence used for the physical uplink control channel in the shortened physical uplink control channel format is the same as that in the prior art. This helps ensure orthogonality of orthogonal sequences used for different PUCCHs, and ensures transmission performance of uplink information carried on a PUCCH.

Figure 11:
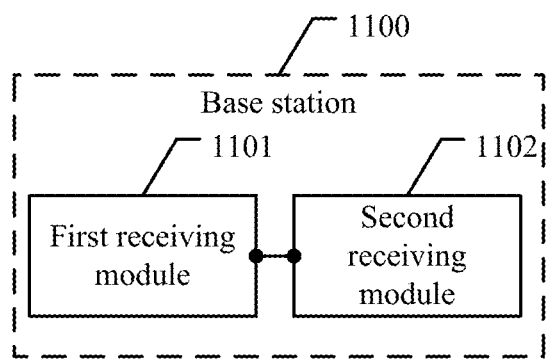
FIG. 11 is a schematic diagram of a composition structure of a base station according to an embodiment of the present invention.

Referring to FIG. 11, a base station 1100 provided in an embodiment of the present invention may include a first receiving module 1101 and a second receiving module 1102.

The first receiving module 1101 is configured to receive first uplink information on a first frequency resource of a first subframe set.

The second receiving module 1102 is configured to receive second uplink information on a second frequency resource of a second subframe set.

The first frequency resource and the second frequency resource are frequency resources included in two different narrowbands.

A radio frame in which a subframe in the first subframe set is located is different from a radio frame in which a subframe in the second subframe set is located, and any subframe included in the first subframe set and any subframe included in the second subframe set belong to different radio frames; or a half-frame in which a subframe in the first subframe set is located is different from a half-frame in which a subframe in the second subframe set is located, and any subframe included in the first subframe set and any subframe included in the second subframe set belong to different half-frames.

In some embodiments of the present invention, the radio frame in which the subframe in the first subframe set is located and the radio frame in which the subframe in the second subframe set is located are adjacent different radio frames, or the half-frame in which the subframe in the first subframe set is located and the half-frame in which the subframe in the second subframe set is located are adjacent different half-frames.

In some embodiments of the present invention, there is only a downlink subframe and/or a special subframe between the first subframe set and the second subframe set that are in a time division duplex (TDD) system.

In some embodiments of the present invention, a start subframe for sending the first uplink information on the first frequency resource is the first available uplink subframe in a radio frame or in a half-frame; and/or a start subframe for sending the second uplink information on the second frequency resource is the first available uplink subframe in a radio frame or in a half-frame; and/or a frequency hopping granularity for sending the first uplink information and/or the second uplink information is 5× M subframes, where M is a preconfigured positive integer.

In some embodiments of the present invention, an information type of the first uplink information is the same as an information type of the second uplink information.

From the descriptions about the present invention in the foregoing embodiment, it can be seen that the base station receives the first uplink information on the first frequency resource of the first subframe set, and the base station receives the second uplink information on the second frequency resource of the second subframe set. The first frequency resource and the second frequency resource are frequency resources included in two different narrowbands. A radio frame in which a subframe in the first subframe set is located is different from a radio frame in which a subframe in the second subframe set is located, and any subframe included in the first subframe set and any subframe included in the second subframe set belong to different radio frames; or a half-frame in which a subframe in the first subframe set is located is different from a half-frame in which a subframe in the second subframe set is located, and any subframe included in the first subframe set and any subframe included in the second subframe set belong to different half-frames. In this embodiment of the present invention, because the first uplink information and the second uplink information are respectively sent by using the first subframe set and the second subframe set that are different, the base station needs to switch between different narrowbands after receiving the first uplink information. In this embodiment of the present invention, it is specified that radio frames (or half-frames) in which subframes in two subframe sets (that is, the first subframe set and the second subframe set) are located are different, and any subframe in the first subframe set and any subframe in the second subframe set belong to different radio frames (or half-frames). Therefore, in this embodiment of the present invention, between the subframe in the first subframe set and the subframe in the second subframe set, there is already an interval in which the UE does not send uplink information, and the UE can perform narrowband switching by using the interval between the subframe in the first subframe set and the subframe in the second subframe set. Different from a prior-art manner in which an additional subframe is reserved as an interval subframe, this embodiment of the present invention can avoid an unnecessary uplink information transmission delay, and avoid an increase in resource scheduling complexity of a base station.

Figure 12:
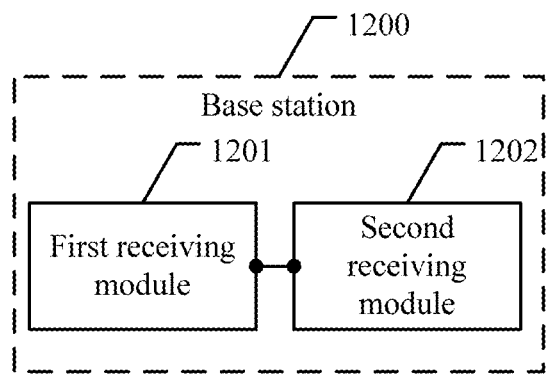
FIG. 12 is a schematic diagram of a composition structure of another base station according to an embodiment of the present invention.

Referring to FIG. 12, a base station 1200 provided in an embodiment of the present invention may include a first receiving module 1201 and a second receiving module 1202.

The first receiving module 1201 is configured to receive first uplink information on a first frequency resource of a first subframe set.

The second receiving module 1202 is configured to receive second uplink information on a second frequency resource of a second subframe set.

The first frequency resource and the second frequency resource are frequency resources included in different narrowbands, and the last subframe in the first subframe set and a start subframe in the second subframe set are adjacent subframes.

The first uplink information is not received in the last A time units of the last subframe in the first subframe set, and/or the second uplink information is not received in the first B time units of the start subframe in the second subframe set, where A and B are natural numbers (non-negative integers).

In some embodiments of the present invention, A=1, and B=1; or

A=2, and B=0; or

A=0, and B=2.

In some embodiments of the present invention, the first uplink information and the second uplink information are two pieces of uplink information carried on a physical uplink control channel, the first uplink information is transmitted in the last subframe in the first subframe set by using a shortened physical uplink control channel format, and the second uplink information is transmitted in the start subframe in the second subframe set by using a shortened physical uplink control channel format.

In some embodiments of the present invention, when the first uplink information is a random access preamble, B=0; or when the second uplink information is a random access preamble, A=0.

In this embodiment of the present invention, only the last A time units of the last subframe in the subframe set and/or the first B time units of the start subframe in the second subframe set are used to adjust a frequency of UE, so that a time used to adjust a frequency is a maximum value of a frequency adjustment time required by the UE. In this case, no additional subframe needs to be reserved as an interval subframe. This avoids an unnecessary uplink information transmission delay, and avoids an increase in resource scheduling complexity of a base station. Further, in this embodiment of the present invention, the first uplink information and the second uplink information are two pieces of uplink information carried on a physical uplink control channel. The uplink information is transmitted by using a shortened physical uplink control channel format. A length of an orthogonal sequence used for the physical uplink control channel in the shortened physical uplink control channel format is the same as that in the prior art. This helps ensure orthogonality of orthogonal sequences used for different PUCCHs, and ensures transmission performance of uplink information carried on a PUCCH.

It should be noted that as regards information exchange between the modules/units of the foregoing apparatuses, the implementation processes, and other details, because they are based on a same conception as the method embodiments of the present invention and bring the same technical effects as those of the method embodiments of the present invention, refer to the descriptions in the method embodiments of the present invention, and no details are repeated herein.

An embodiment of the present invention provides a computer storage medium. The computer storage medium stores a program, and the program executes some or all of the operations recorded in the foregoing method embodiments.

Figure 13:
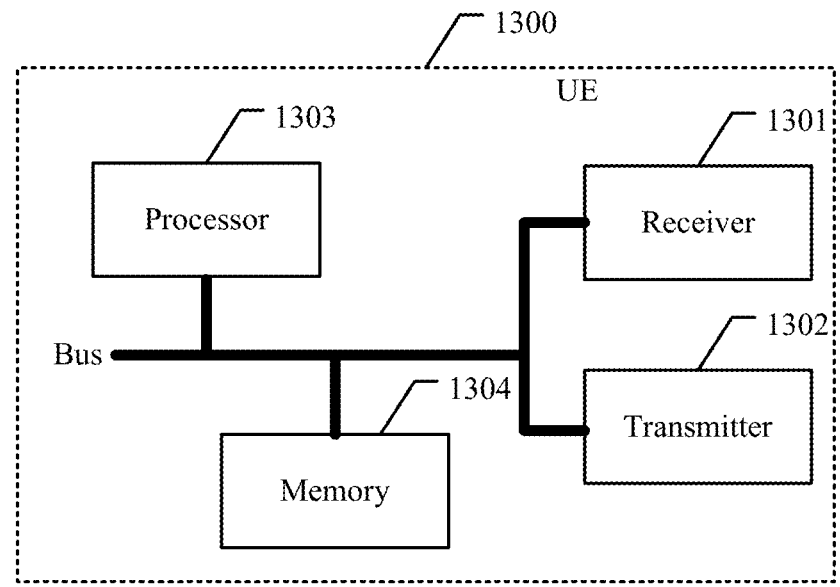
FIG. 13 is a schematic diagram of a composition structure of another UE according to an embodiment of the present invention.

The following describes another UE provided in an embodiment of the present invention. Referring to FIG. 13, UE 1300 includes:

a receiver 1301, a transmitter 1302, a processor 1303, and a memory 1304 (there may be one or more processors 1303 in the UE 1300, and one processor is used as an example in FIG. 13), where in some embodiments of the present invention, the receiver 1301, the transmitter 1302, the processor 1303, and the memory 1304 may be connected by using a bus or in another manner, and in FIG. 13, a bus connection is used as an example.

The processor 1303 is configured to perform the following operations:

sending first uplink information on a first frequency resource of a first subframe set; and sending second uplink information on a second frequency resource of a second subframe set.

The first frequency resource and the second frequency resource are frequency resources included in two different narrowbands.

A radio frame in which a subframe in the first subframe set is located is different from a radio frame in which a subframe in the second subframe set is located, and any subframe included in the first subframe set and any subframe included in the second subframe set belong to different radio frames; or a half-frame in which a subframe in the first subframe set is located is different from a half-frame in which a subframe in the second subframe set is located, and any subframe included in the first subframe set and any subframe included in the second subframe set belong to different half-frames.

In some embodiments of the present invention, the radio frame in which the subframe in the first subframe set is located and the radio frame in which the subframe in the second subframe set is located are adjacent different radio frames, or the half-frame in which the subframe in the first subframe set is located and the half-frame in which the subframe in the second subframe set is located are adjacent different half-frames.

In some embodiments of the present invention, there is only a downlink subframe and/or a special subframe between the first subframe set and the second subframe set that are in a time division duplex (TDD) system.

In some embodiments of the present invention, a start subframe for sending the first uplink information on the first frequency resource is the first available uplink subframe in a radio frame or in a half-frame; and/or a start subframe for sending the second uplink information on the second frequency resource is the first available uplink subframe in a radio frame or in a half-frame; and/or a frequency hopping granularity for sending the first uplink information and/or the second uplink information is 5× M subframes, where M is a preconfigured positive integer.

In some embodiments of the present invention, an information type of the first uplink information is the same as an information type of the second uplink information.

From the descriptions about the present invention in the foregoing embodiment, it can be seen that the UE sends the first uplink information on the first frequency resource of the first subframe set, and the UE sends the second uplink information on the second frequency resource of the second subframe set. The first frequency resource and the second frequency resource are frequency resources included in two different narrowbands. A radio frame in which a subframe in the first subframe set is located is different from a radio frame in which a subframe in the second subframe set is located, and any subframe included in the first subframe set and any subframe included in the second subframe set belong to different radio frames; or a half-frame in which a subframe in the first subframe set is located is different from a half-frame in which a subframe in the second subframe set is located, and any subframe included in the first subframe set and any subframe included in the second subframe set belong to different half-frames. In this embodiment of the present invention, because the first uplink information and the second uplink information are respectively sent by using the first subframe set and the second subframe set that are different, the UE needs to switch between different narrowbands after sending the first uplink information. In this embodiment of the present invention, it is specified that radio frames (or half-frames) in which subframes in two subframe sets (that is, the first subframe set and the second subframe set) are located are different, and any subframe in the first subframe set and any subframe in the second subframe set belong to different radio frames (or half-frames). Therefore, in this embodiment of the present invention, between the subframe in the first subframe set and the subframe in the second subframe set, there is already an interval in which the UE does not send uplink information, and the UE can perform narrowband switching by using the interval between the subframe in the first subframe set and the subframe in the second subframe set. Different from a prior-art manner in which an additional subframe is reserved as an interval subframe, this embodiment of the present invention can avoid an unnecessary uplink information transmission delay, and avoid an increase in resource scheduling complexity of a base station.

The following describes another UE provided in an embodiment of the present invention. A structure of the UE is the same as that of the UE 1300 shown in FIG. 13. However, the processor 1303 is configured to perform the following operations:

sending first uplink information on a first frequency resource of a first subframe set; and sending second uplink information on a second frequency resource of a second subframe set.

The first frequency resource and the second frequency resource are frequency resources included in different narrowbands, and the last subframe in the first subframe set and a start subframe in the second subframe set are adjacent subframes.

The first uplink information is not sent in the last A time units of the last subframe in the first subframe set, and/or the second uplink information is not sent in the first B time units of the start subframe in the second subframe set, where A and B are natural numbers (non-negative integers).

In some embodiments of the present invention, A=1, and B=1; or

A=2, and B=0; or

A=0, andB=2.

In some embodiments of the present invention, the first uplink information and the second uplink information are two pieces of uplink information carried on a physical uplink control channel, the first uplink information is transmitted in the last subframe in the first subframe set by using a shortened physical uplink control channel format, and the second uplink information is transmitted in the start subframe in the second subframe set by using a shortened physical uplink control channel format.

In some embodiments of the present invention, when the first uplink information is a random access preamble, B=0; or when the second uplink information is a random access preamble, A=0.

In this embodiment of the present invention, only the last A time units of the last subframe in the first subframe set and/or the first B time units of the start subframe in the second subframe set are used to adjust a frequency of UE, so that a time used to adjust a frequency is a maximum value of a frequency adjustment time required by the UE. In this case, no additional subframe needs to be reserved as an interval subframe. This avoids an unnecessary uplink information transmission delay, and avoids an increase in resource scheduling complexity of a base station. Further, in this embodiment of the present invention, the first uplink information and the second uplink information are two pieces of uplink information carried on a physical uplink control channel. The uplink information is transmitted by using a shortened physical uplink control channel format. Particularly, a length of an orthogonal sequence used for the physical uplink control channel in the shortened physical uplink control channel format is the same as that in the prior art. This helps ensure orthogonality of orthogonal sequences used for different PUCCHs, and ensures transmission performance of uplink information carried on a PUCCH.

Figure 14:
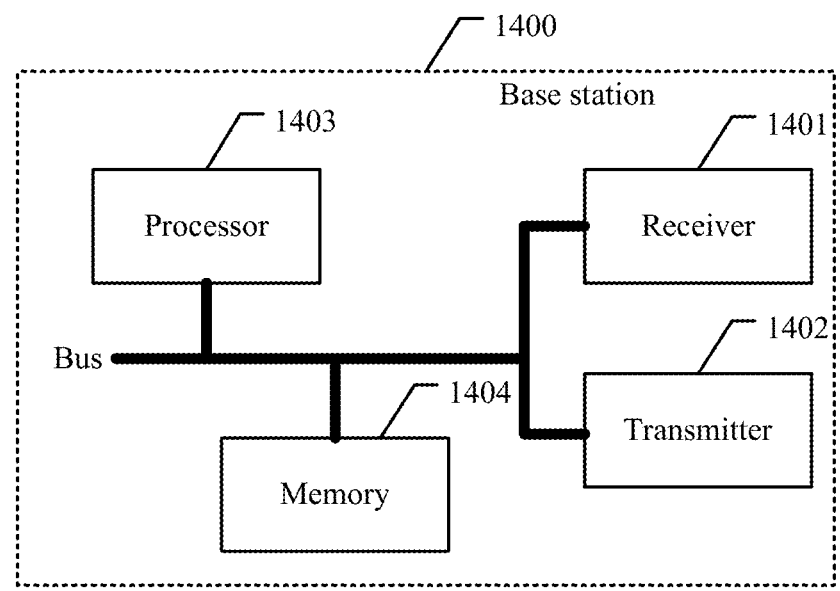
FIG. 14 is a schematic diagram of a composition structure of another base station according to an embodiment of the present invention.

The following describes another base station provided in an embodiment of the present invention. Referring to FIG. 14, a base station 1400 includes:

a receiver 1401, a transmitter 1402, a processor 1403, and a memory 1404 (there may be one or more processors 1403 in the base station 1400, and one processor is used as an example in FIG. 14), where in some embodiments of the present invention, the receiver 1401, the transmitter 1402, the processor 1403, and the memory 1404 may be connected by using a bus or in another manner, and in FIG. 14, a bus connection is used as an example.

The processor 1403 is configured to perform the following operations:

receiving first uplink information on a first frequency resource of a first subframe set; and receiving second uplink information on a second frequency resource of a second subframe set.

The first frequency resource and the second frequency resource are frequency resources included in two different narrowbands.

A radio frame in which a subframe in the first subframe set is located is different from a radio frame in which a subframe in the second subframe set is located, and any subframe included in the first subframe set and any subframe included in the second subframe set belong to different radio frames; or a half-frame in which a subframe in the first subframe set is located is different from a half-frame in which a subframe in the second subframe set is located, and any subframe included in the first subframe set and any subframe included in the second subframe set belong to different half-frames.

In some embodiments of the present invention, the radio frame in which the subframe in the first subframe set is located and the radio frame in which the subframe in the second subframe set is located are adjacent different radio frames, or the half-frame in which the subframe in the first subframe set is located and the half-frame in which the subframe in the second subframe set is located are adjacent different half-frames.

In some embodiments of the present invention, there is only a downlink subframe and/or a special subframe between the first subframe set and the second subframe set that are in a time division duplex (TDD) system.

In some embodiments of the present invention, a start subframe for sending the first uplink information on the first frequency resource is the first available uplink subframe in a radio frame or in a half-frame; and/or a start subframe for sending the second uplink information on the second frequency resource is the first available uplink subframe in a radio frame or in a half-frame; and/or a frequency hopping granularity for sending the first uplink information and/or the second uplink information is 5× M subframes, where M is a preconfigured positive integer.

In some embodiments of the present invention, an information type of the first uplink information is the same as an information type of the second uplink information.

From the descriptions about the present invention in the foregoing embodiment, it can be seen that the base station receives the first uplink information on the first frequency resource of the first subframe set, and the base station receives the second uplink information on the second frequency resource of the second subframe set. The first frequency resource and the second frequency resource are frequency resources included in two different narrowbands. A radio frame in which a subframe in the first subframe set is located is different from a radio frame in which a subframe in the second subframe set is located, and any subframe included in the first subframe set and any subframe included in the second subframe set belong to different radio frames; or a half-frame in which a subframe in the first subframe set is located is different from a half-frame in which a subframe in the second subframe set is located, and any subframe included in the first subframe set and any subframe included in the second subframe set belong to different half-frames. In this embodiment of the present invention, because the first uplink information and the second uplink information are respectively sent by using the first subframe set and the second subframe set that are different, the base station needs to switch between different narrowbands after receiving the first uplink information. In this embodiment of the present invention, it is specified that radio frames (or half-frames) in which subframes in two subframe sets (that is, the first subframe set and the second subframe set) are located are different, and any subframe in the first subframe set and any subframe in the second subframe set belong to different radio frames (or half-frames). Therefore, in this embodiment of the present invention, between the subframe in the first subframe set and the subframe in the second subframe set, there is already an interval in which the UE does not send uplink information, and the UE can perform narrowband switching by using the interval between the subframe in the first subframe set and the subframe in the second subframe set. Different from a prior-art manner in which an additional subframe is reserved as an interval subframe, this embodiment of the present invention can avoid an unnecessary uplink information transmission delay, and avoid an increase in resource scheduling complexity of a base station.

The following describes another base station provided in an embodiment of the present invention. A structure of the base station is the same as that of the base station 1400 shown in FIG. 14. However, the processor 1403 is configured to perform the following operations:

receiving first uplink information on a first frequency resource of a first subframe set; and receiving second uplink information on a second frequency resource of a second subframe set.

The first frequency resource and the second frequency resource are frequency resources included in different narrowbands, and the last subframe in the first subframe set and a start subframe in the second subframe set are adjacent subframes.

The first uplink information is not received in the last A time units of the last subframe in the first subframe set, and/or the second uplink information is not received in the first B time units of the start subframe in the second subframe set, where A and B are natural numbers (non-negative integers).

In some embodiments of the present invention, A=1, and B=1; or

A=2, and B=0; or

A=0, and B=2.

In some embodiments of the present invention, the first uplink information and the second uplink information are two pieces of uplink information carried on a physical uplink control channel, the first uplink information is transmitted in the last subframe in the first subframe set by using a shortened physical uplink control channel format, and the second uplink information is transmitted in the start subframe in the second subframe set by using a shortened physical uplink control channel format.

In some embodiments of the present invention, when the first uplink information is a random access preamble, B=0; or when the second uplink information is a random access preamble, A=0.

In this embodiment of the present invention, only the last A time units of the last subframe in the subframe set and/or the first B time units of the start subframe in the second subframe set are used to adjust a frequency of UE, so that a time used to adjust a frequency is a maximum value of a frequency adjustment time required by the UE. In this case, no additional subframe needs to be reserved as an interval subframe. This avoids an unnecessary uplink information transmission delay, and avoids an increase in resource scheduling complexity of a base station. Further, in this embodiment of the present invention, the first uplink information and the second uplink information are two pieces of uplink information carried on a physical uplink control channel. The uplink information is transmitted by using a shortened physical uplink control channel format. A length of an orthogonal sequence used for the physical uplink control channel in the shortened physical uplink control channel format can be the same as that in the prior art. This helps ensure orthogonality of orthogonal sequences used for different PUCCHs, and ensures transmission performance of uplink information carried on a PUCCH.

In addition, it should be noted that the described apparatus embodiments are merely examples. The units described as separate parts may or may not be physically separated, and parts shown as units may or may not be physical units, may be located in one position, or may be distributed on multiple network units. Some or all of the modules may be selected according to actual needs to achieve the objectives of the solutions of the embodiments. In addition, in the accompanying drawings of the apparatus embodiments that are provided in the present invention, connection relationships between modules indicate that the modules are in communication connection with each other, which may be specifically implemented as one or more communications buses or signal cables. Persons of ordinary skill in the art, in possession of this disclosure, may understand and implement additional the embodiments of the present invention.

Based on the descriptions of the foregoing implementations, persons skilled in the art may clearly understand that the present invention may be implemented by software and necessary general-purpose hardware, or by dedicated hardware, including a dedicated integrated circuit, a dedicated CPU, a dedicated memory, a dedicated component, and the like. Generally, any functions that are performed by a computer program can be easily implemented by using corresponding hardware. Moreover, a specific hardware structure used to implement a same function may be in various forms, for example, in a form of an analog circuit, a digital circuit, or a dedicated circuit. However, an implementation in which a software program is used for implementing the present invention can also be used. Based on such an understanding, the technical solutions of the present invention essentially or the part contributing to the prior art may be implemented in a form of a software product. The software product is stored in a readable storage medium, such as a floppy disk, a USB flash drive, a removable hard disk, a read-only memory (ROM, Read-Only Memory), a random access memory (RAM, Random Access Memory), a magnetic disk, or an optical disc of a computer, and includes several instructions for instructing a computer device (which may be a personal computer, a server, a network device, or the like) to perform the methods described in the embodiments of the present invention.

To sum up, the foregoing embodiments are intended for describing the technical solutions of the present invention, and not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions in the embodiments of the present invention.

What is claimed is:

1. An apparatus comprising:
a storage medium including executable instructions; and
a processor;
wherein the executable instructions, when executed by the processor, cause the apparatus to:
perform a first uplink transmission in a subframe within a first subframe set using a first frequency resource within a first narrowband, the first subframe set being located in a first radio frame; and
perform a second uplink transmission in a subframe within a second subframe set using a second frequency resource within a second narrowband, the second narrowband being different from the first narrowband, the second subframe set being located in a second radio frame, wherein the first uplink transmission and the second uplink transmission are adjacent uplink transmissions in time from the apparatus, and wherein no reserved interval subframe is present between the first subframe set and the second subframe set.

2. The apparatus according to claim 1, wherein the first radio frame and the second radio frame are adjacent radio frames.

3. The apparatus according to claim 1, wherein there is only at least one of a downlink subframe or a special subframe between the subframe in the first subframe set and the second subframe set that are in a time division duplex (TDD) system.

4. The apparatus according to claim 1, wherein a start subframe for performing the second uplink transmission on the second frequency resource is the first available uplink subframe in a radio frame or in a half-frame.

5. The apparatus according to claim 1, wherein a frequency hopping granularity for performing uplink transmissions is 5×M subframes, M being a preconfigured positive integer.

6. An apparatus comprising:
a storage medium including executable instructions; and
a processor;
wherein the executable instructions, when executed by the processor, cause the apparatus to:
receive a first uplink transmission in a subframe within a first subframe set using a first frequency resource within a first narrowband, the first subframe set being located in a first radio frame; and
receive a second uplink transmission in a subframe within a second subframe set using a second frequency resource within a second narrowband, the second narrowband being different from the first narrowband, the second subframe set being located in a second radio frame, wherein the first uplink transmission and the second uplink transmission are adjacent uplink transmissions in time from a same transmitter, and wherein no reserved interval subframe is present between the first subframe set and the second subframe set.

7. The apparatus according to claim 6, wherein the first radio frame and the second radio frame are adjacent radio frames.

8. The apparatus according to claim 6, wherein there is only at least one of a downlink subframe or a special subframe between the first subframe set and the second subframe set that are in a time division duplex (TDD) system.

9. The apparatus according to claim 6, wherein a start subframe for receiving the second uplink transmission on the second frequency resource is the first available uplink subframe in a radio frame or in a half-frame.

10. The apparatus according to claim 6, wherein a frequency hopping granularity for performing uplink transmissions is 5×M subframes, M being a preconfigured positive integer.

11. An uplink transmission method, comprising:
performing, by user equipment (UE), a first uplink transmission in a subframe within a first subframe set using a first frequency resource within a first narrowband, the first subframe set being located in a first radio frame; and
performing, by the UE, a second uplink transmission in a subframe within a second subframe set using a second frequency resource within a second narrowband, the second narrowband being different from the firm narrowband, the second subframe set being located in a second radio frame, wherein the first uplink transmission and the second uplink transmission are adjacent uplink transmissions in time from the UE, and wherein no reserved interval subframe is present between the first subframe set and the second subframe set.

12. The method according to claim 11, wherein the first radio frame and the second radio frame are adjacent radio frames.

13. The method according to claim 11, wherein there is only at least one of a downlink subframe or a special subframe between the first subframe set and the second subframe set that are in a time division duplex (TDD) system.

14. The method according to claim 11, wherein a start subframe for performing the second uplink transmission on the second frequency resource is the first available uplink subframe in a radio frame or in a half-frame.

15. The method according to claim 11, wherein a frequency hopping granularity for performing uplink transmissions is 5×M subframes, wherein M is a preconfigured positive integer.

16. An uplink transmission receiving method, comprising:
receiving, by a base station, a first uplink transmission in a subframe within a first subframe set using a first frequency resource within a first narrowband, the first subframe set being located in a first radio frame; and
receiving, by the base station, a second uplink transmission in a subframe within a second subframe set using a second frequency resource within a second narrowband, the second narrowband being different from the first narrowband, the second subframe set being located in a second radio frame, wherein the first uplink transmission and the second uplink transmission are adjacent uplink transmissions in time from a same transmitter, and wherein no reserved interval subframe is present between the first subframe set and the second subframe set.

17. The method according to claim 16, wherein the first radio frame and the second radio frame are adjacent radio frames.

18. The method according to claim 16, wherein there is only at least one of a downlink subframe or a special subframe between the first subframe set and the second subframe set that are in a time division duplex (TDD) system.

19. The method according to claim 16, wherein a start subframe for performing the second uplink transmission on the second frequency resource is the first available uplink subframe in a radio frame or in a half-frame.

20. The method according to claim 16, wherein a frequency hopping granularity for performing uplink transmissions is 5×M subframes, wherein M is a preconfigured positive integer.

* * * * *

UNITED STATES PATENT AND TRADEMARK OFFICE
CERTIFICATE OF CORRECTION

PATENT NO. : 10,945,242 B2
APPLICATION NO. : 15/933348
DATED : March 9, 2021
INVENTOR(S) : Fang Nan et al.

Page 1 of 1

It is certified that error appears in the above-identified patent and that said Letters Patent is hereby corrected as shown below:

In the Claims

In Claim 11, Column 40, Line 24, delete "firm" and insert --first--.

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*